United States Patent
Ochi et al.

(10) Patent No.: US 9,501,721 B2
(45) Date of Patent: Nov. 22, 2016

(54) INFORMATION PROCESSING APPARATUS, INFORMATION PROCESSING METHOD, AND PROGRAM FOR ESTIMATING A PROFILE FOR A PERSON

(71) Applicant: Sony Corporation, Tokyo (JP)

(72) Inventors: Takayuki Ochi, Kanagawa (JP); Kazuhiro Nakagomi, Tokyo (JP); Yorimitsu Naito, Saitama (JP); Takamasa Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 493 days.

(21) Appl. No.: 13/837,894

(22) Filed: Mar. 15, 2013

(65) Prior Publication Data
US 2013/0301939 A1 Nov. 14, 2013

(30) Foreign Application Priority Data

May 14, 2012 (JP) ................. 2012-110930

(51) Int. Cl.
*G06K 9/62* (2006.01)
*G06K 9/00* (2006.01)
*G06F 17/30* (2006.01)
*G06Q 30/02* (2012.01)

(52) U.S. Cl.
CPC ....... *G06K 9/6267* (2013.01); *G06F 17/30247* (2013.01); *G06K 9/00677* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 8,700,540 B1 * | 4/2014 | Zambrano et al. | 705/319 |
| 2009/0094518 A1 * | 4/2009 | Lawther et al. | 715/716 |
| 2011/0182485 A1 * | 7/2011 | Shochat et al. | 382/118 |
| 2012/0290565 A1 * | 11/2012 | Wana et al. | 707/723 |
| 2012/0313964 A1 | 12/2012 | Sato et al. | |
| 2012/0314915 A1 | 12/2012 | Ochi et al. | |
| 2014/0012918 A1 * | 1/2014 | Chin et al. | 709/204 |

FOREIGN PATENT DOCUMENTS

JP 2007-328212 12/2007

OTHER PUBLICATIONS

Rowe, Matthew. "Interlinking Distributed Social Graphs." LDOW. 2009.*

* cited by examiner

*Primary Examiner* — Andrew Moyer
(74) *Attorney, Agent, or Firm* — Chip Law Group

(57) ABSTRACT

There is provided an information processing apparatus, including an event information analyzing section which analyzes event information related to an event in which a person participates, a person image group analyzing section which analyzes, for the person participating in the event, a person image group including one or a plurality of person images including the person, and a profile estimation section which estimates a profile of the person participating in the event based on a result obtained by analyzing the person image group and a result obtained by analyzing the event information.

21 Claims, 17 Drawing Sheets

PROFILE DISPLAY EXAMPLE USING CERTAINTY FACTORS

FIG. 5
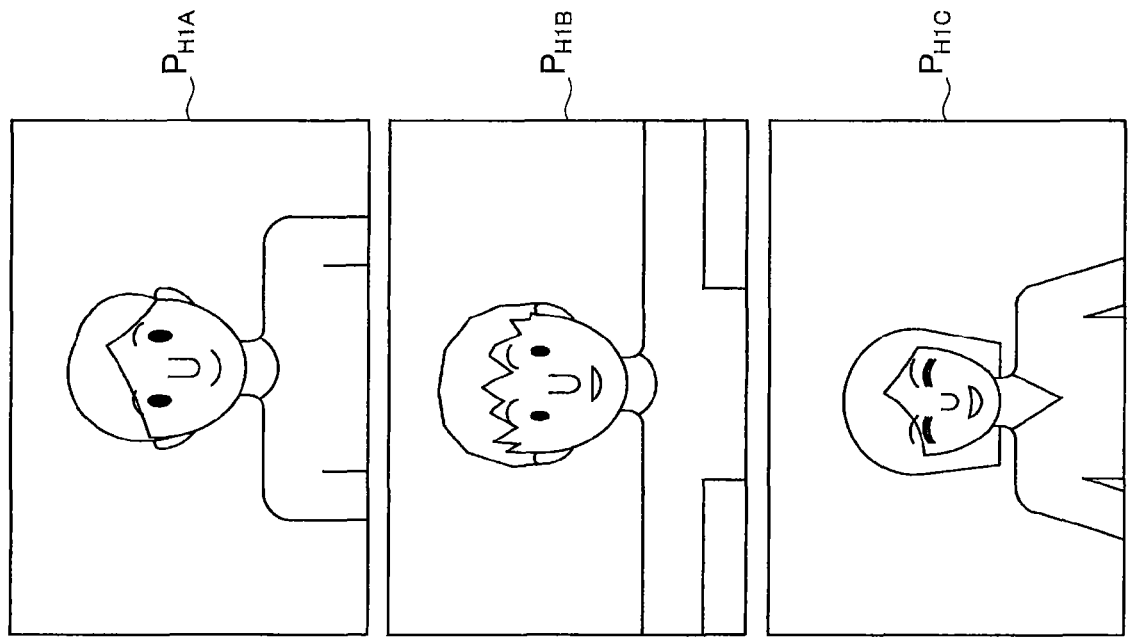
EVENT IMAGE → PERSON IMAGES
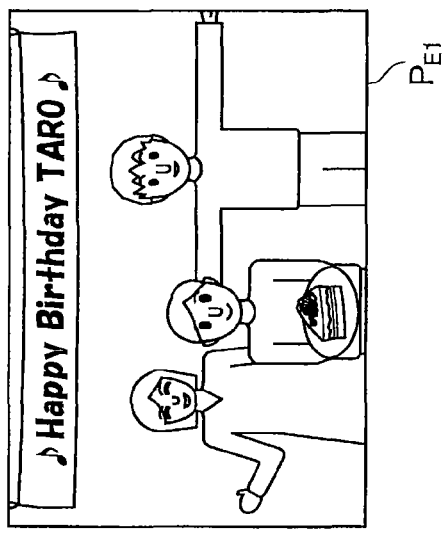

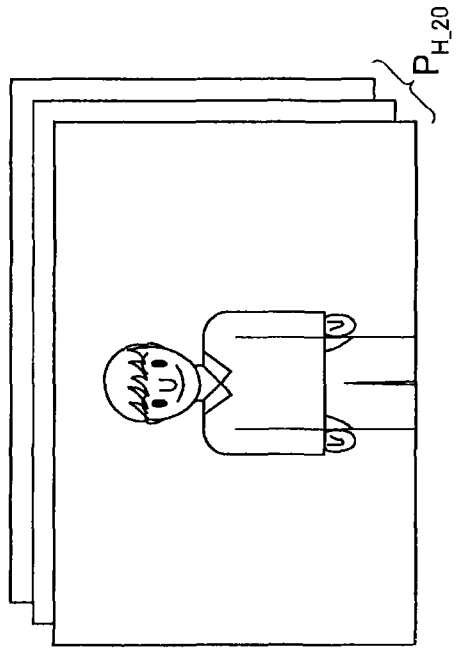
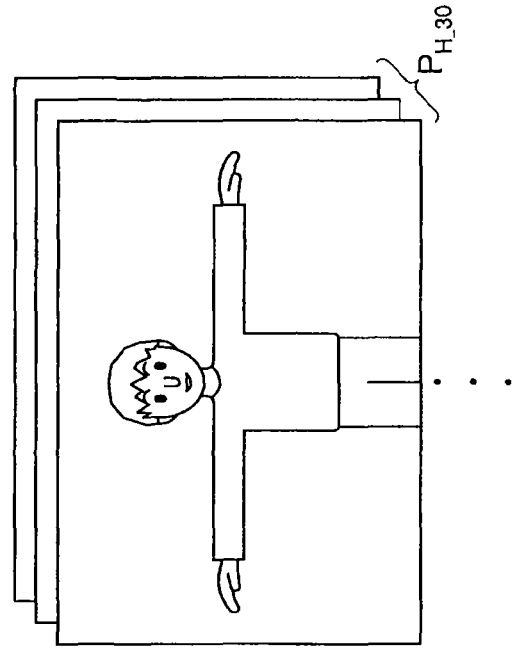
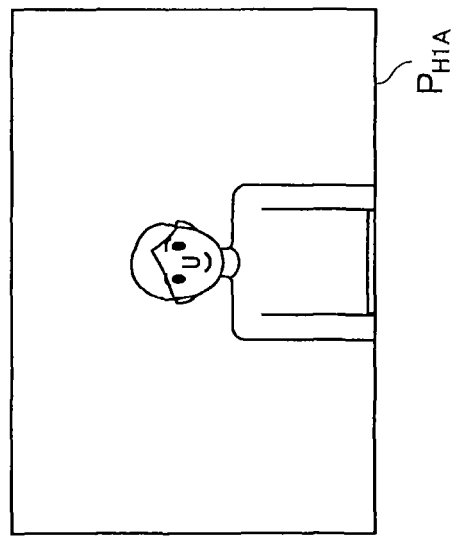
FIG. 7

FIG. 8

| EVENT INCIDENTAL INFORMATION | VALUE |
|---|---|
| EVENT DATE | NOVEMBER 10 2011/JULY 2012... |
| EVENT LOCATION | A HOTEL/TARO'S HOUSE... |
| EVENT TITLE | B UNIVERSITY OB ASSOCIATION/TARO'S BIRTHDAY PARTY |
| EVENT TYPE | DRINKING PARTY/BIRTHDAY PARTY |
| EVENT MAIN PERSON'S NAME | NONE/TARO |

FIG. 9

| PROFILE ITEM | VALUE |
|---|---|
| NAME | TARO/JIRO/SABURO... |
| SEX | MALE/FEMALE |
| AGE | 10 YEARS OLD/25 YEARS OLD/50 YEARS OLD... |
| PLACE OF RESIDENCE | KANAGAWA PREFECTURE/MINATO WARD... |
| HOMETOWN | OSAKA PREFECTURE/NAGOYA CITY... |
| DATE OF BIRTH | BORN AROUND JULY 1970/BORN IN OCTOBER... |
| ALMA MATER | AAA UNIVERSITY/GRADUATED FROM BBB UNIVERSITY... |
| WORKPLACE | CCC COMPANY LIMITED/INCORPORATED COMPANY DDD... |

FIG. 10

| PROFILE ITEM | VALUE | CERTAINTY FACTOR |
|---|---|---|
| NAME | YAMADA TARO | 70 |
| SEX | MALE | 30 |
| AGE | 30 YEARS OLD | 35 |
| PLACE OF RESIDENCE | TOKYO PREFECTURE | 60 |
| HOMETOWN | OSAKA PREFECTURE | 65 |
| DATE OF BIRTH | JULY | 60 |
| ALMA MATER | AAA UNIVERSITY | 95 |
| WORKPLACE | CCC COMPANY LIMITED | 90 |

FIG. 12
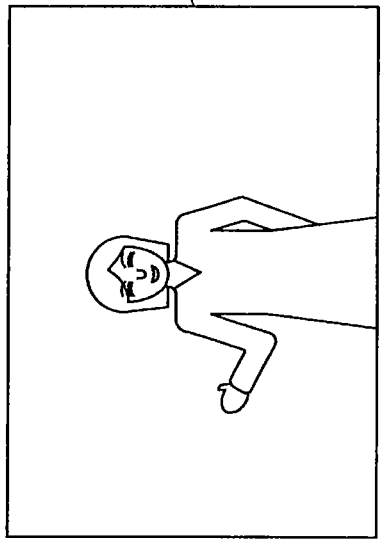
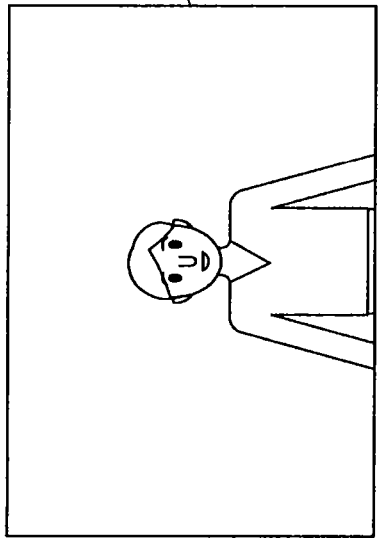
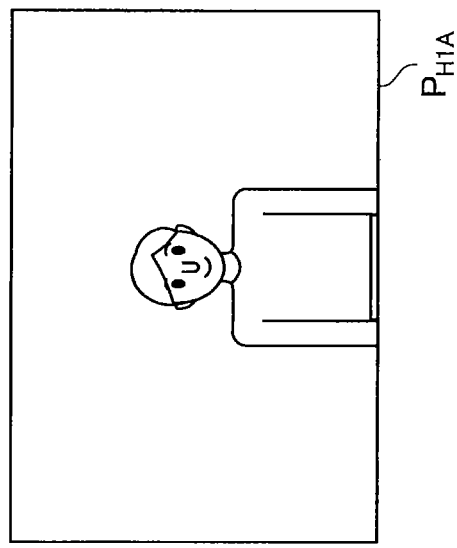

PROFILE UPDATING METHOD USING CERTAINTY FACTORS

FIG. 15
EVENT SEARCH USING CERTAINTY FACTORS
SEARCH WORD: AAA UNIVERSITY
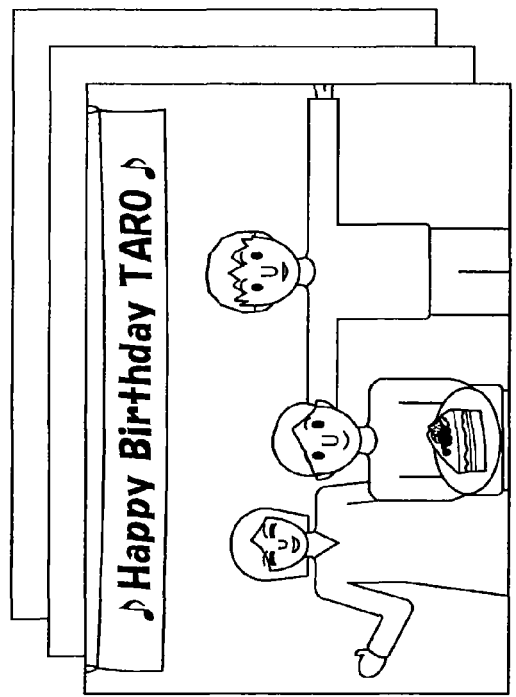
SEARCH RESULT 1: "AAA UNIVERSITY OB ASSOCIATION"
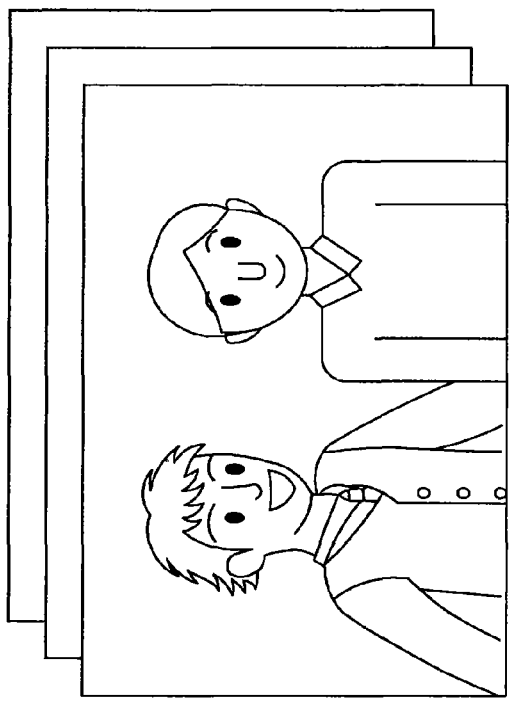
SEARCH RESULT 2: "TARO'S BIRTHDAY PARTY"

FIG. 16
EVENT SEARCH RESULT DISPLAY USING CERTAINTY FACTORS
SEARCH WORD: AAA UNIVERSITY
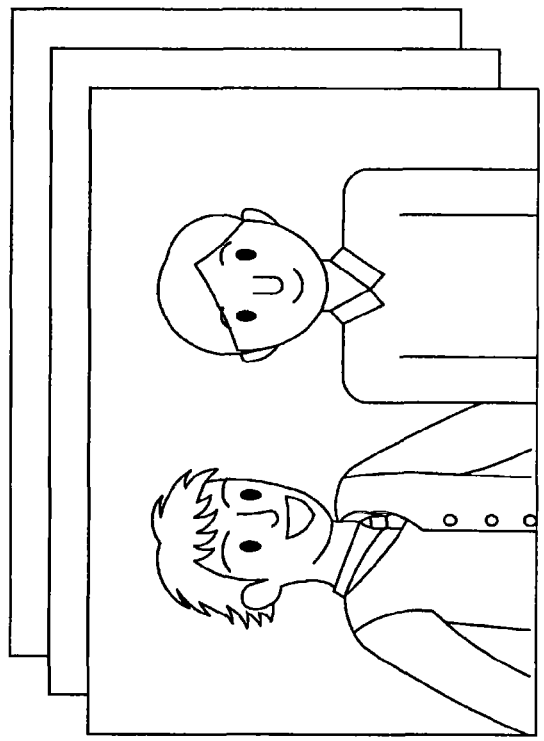
SEARCH RESULT 1: "AAA UNIVERSITY OB ASSOCIATION"
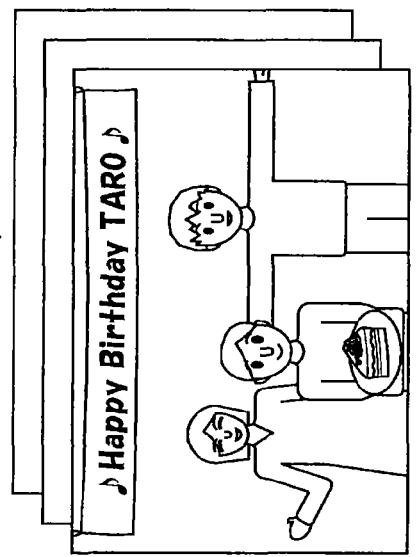
SEARCH RESULT 2: "TARO'S BIRTHDAY PARTY"

INFORMATION PROCESSING APPARATUS, INFORMATION PROCESSING METHOD, AND PROGRAM FOR ESTIMATING A PROFILE FOR A PERSON

BACKGROUND

The present disclosure relates to an information processing apparatus, an information processing method, and a program.

In recent years, technology has been disclosed which determines the age, sex or the like of a person included in an image by image analysis.

For example, technology is disclosed in JP 2007-328212A which determines attributes, such as the race, sex, or physique, of a picked-up person by image analysis, and calculates a distance to this person. Further, in this technology, focus control is additionally performed by using the calculation result of the distance to this person.

SUMMARY

However, in the technology disclosed in JP 2007-328212A, a profile of the person is not generated. Accordingly, a user is only able to temporarily use the attribute information of the determined person for a specific purpose.

Accordingly, the present disclosure has been conceived in response to such a situation, and is intended to provide a new and improved information processing apparatus, information processing method, and program, capable of estimating a profile of a person participating in events.

According to an embodiment of the present disclosure, there is provided an information processing apparatus, including an event information analyzing section which analyzes event information related to an event in which a person participates, a person image group analyzing section which analyzes, for the person participating in the event, a person image group including one or a plurality of person images including the person, and a profile estimation section which estimates a profile of the person participating in the event based on a result obtained by analyzing the person image group and a result obtained by analyzing the event information.

Further, according to an embodiment of the present disclosure, there is provided an information processing method, including analyzing event information related to an event in which a person participates, analyzing, for the person participating in the event, a person image group including one or a plurality of person images including the person, and estimating a profile of the person participating in the event based on a result obtained by analyzing the person image group and a result obtained by analyzing the event information.

Further, according to an embodiment of the present disclosure, there is provided a program for causing a computer to implement an event information analyzing function which analyzes event information related to an event in which a person participates, a person image group analyzing function which analyzes, for the person participating in the event, a person image group including one or a plurality of person images including the person, and a profile estimation function which estimates a profile of the person participating in the event based on a result obtained by analyzing the person image group and a result obtained by analyzing the event information.

According to the embodiments of the present disclosure described above, a new and improved information processing apparatus, information processing method, and program are provided, capable of estimating a profile of a person participating in events.

BRIEF DESCRIPTION OF THE DRAWINGS

FIG. 5 is an explanatory diagram for describing an example of the processes performed by a person image group acquisition section according to the first embodiment;

FIG. 7 is an explanatory diagram for describing an example of the processes performed by a person attribute determination section according to the first embodiment;

FIG. 8 is an explanatory diagram for describing event incidental information according to the first embodiment;

FIG. 9 is an explanatory diagram for describing profile items according to the first embodiment;

FIG. 10 is an explanatory diagram for describing certainty factors of profile items according to the first embodiment;

FIG. 12 is an explanatory diagram for describing the modified example according to the first embodiment;

FIG. 15 is an explanatory diagram for describing a second application example according to the first embodiment;

FIG. 16 is an explanatory diagram for describing the second application example;

DETAILED DESCRIPTION OF THE EMBODIMENT(S)

Figure 1:
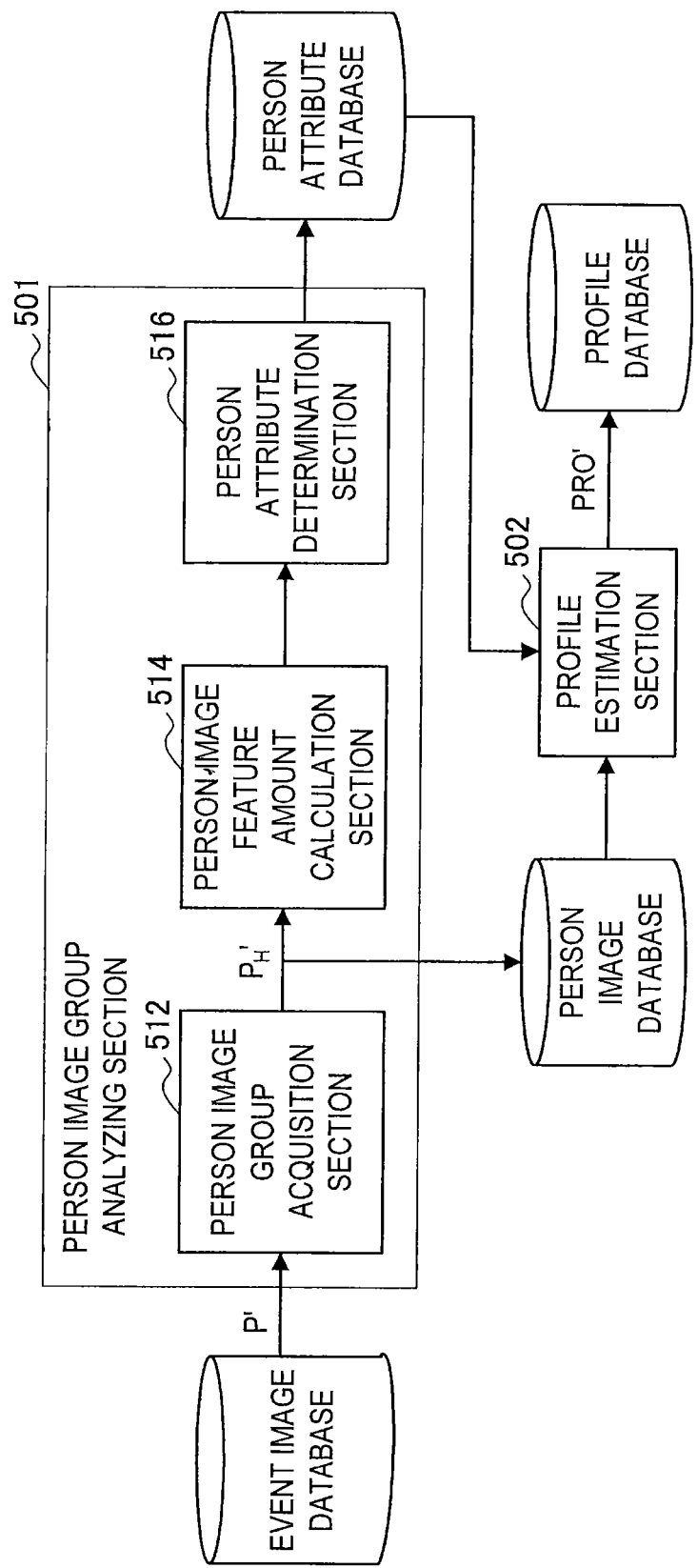
FIG. 1 is an explanatory diagram for describing an information processing apparatus which performs profile estimation of a person based on person image group analysis.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1: Introduction
 1-1: Profile estimation based on person image group analysis (FIG. 1)
 1-2: Flow of profile estimation based on person image group analysis (FIG. 2)
2: Basic Configuration of the Information Processing Apparatus 10 (Image analysis+Event information; FIGS. 3 to 10)
3: Modified Example (Image analysis+Event information+Web site information)
 3-1: Configuration of the information processing apparatus according to the modified example (FIG. 11)
 3-2: Processes performed by the profile updating section 158
  3-2-1: Profile updating method using images (FIG. 12)
  3-2-2: Profile updating method using certainty factors (FIG. 13)
  3-2-3: Profile updating method using images and certainty factors
4: Application Examples
 4-1: First application example (Profile display using certainty factors; FIG. 14)
 4-2: Second application example (Event search using certainty factors; FIGS. 15 and 16)
5: Process Flow Performed by the Information Processing Apparatus 10
 5-1: Process flow in the case of the basic configuration (FIG. 17)
 5-2: Process flow in the case of the modified example (FIG. 18)
6: Conclusion <1: Introduction>

Before describing the technology according to the present embodiment, profile estimation technology capable of being used in the technology according to the present embodiment will be introduced. This profile estimation technology relates to a method which estimates a profile of a person, by analyzing a person image group which includes one or a plurality of person images including this person as a photographic subject.

Hereinafter, first an example of a configuration of an information processing apparatus 50 using this technology will be described with reference to FIG. 1. Then, a process flow performed by this information processing apparatus 50 will be described with reference to FIG. 2.

[1-1: Profile Estimation Based on Person Image Group Analysis (FIG. 1)]

FIG. 1 is an explanatory diagram for describing the information processing apparatus 50 which performs profile estimation of a person based on person image group analysis. As shown in FIG. 1, the information processing apparatus 50 mainly includes a person image group analyzing section 501, and a profile estimation section 502.

The person image group analyzing section 501 analyzes an input image, and determines attributes of a picked-up person. The profile estimation section 502 estimates a profile of this person, based on the person attributes determined by the person image group analyzing section 501. Hereinafter, the processes performed by the person image group analyzing section 501 and the profile estimation section 502 will be described in detail.

An image group, which includes one or a plurality of images from an image database, is input to a person image group acquisition section 512 of the person image group analyzing section 501. Hereinafter, a description will be carried forward by focusing on one image included in an image group P' input to the person image group acquisition section 512.

In the case where the image input to the person image group acquisition section 512 is a picked-up image which also includes photographic subjects other than persons, the person image group acquisition section 512 functions as a person image extraction section which extracts a person image $P_H'$, which is a part in which persons are included, from the input picked-up image.

Further, in the case where a plurality of persons are included in one picked-up image, the person image group acquisition section 512 acquires parts in which each person is included, and makes a person image of each person.

The person image $P_H'$ acquired by the person image group acquisition section 512 is input to a person image feature amount calculation section 514. When the person image $P_H'$ is input, the person image feature amount calculation section 514 calculates feature amounts of the person image $P_H'$.

The calculated feature amounts are used by the person attribute determination section 516, which is described later, for determining attributes of persons. For example, the person image feature amount calculation section 514 calculates the positions of a plurality of points on the line of the eyelids of a person as a feature amount, or calculates the shape of the eyelids based on the calculated positions of the plurality of points on the line of the eyelids as a feature amount.

Further, the person image $P_H'$ acquired by the person image group acquisition section 512 is stored in a person image database.

The feature amounts of the person images calculated by the person image feature amount calculation section 514 are input to the person attribute determination section 516. The person attribute determination section 516 determines the attributes of the persons corresponding to the person image $P_H'$, based on the input feature amounts.

The attributes of persons are, for example, the "sex", "age" or the like of these persons. The "age" of a person may be calculated by setting age brackets having prescribed ranges as candidates, such as "teenager", "twenties" or the like. Person attribute information, such as "sex" is "male" and "age" is "thirties", for example, is output from the person attribute determination section 516.

The person attribute information determined by the person attribute determination section 516 is stored in a person attribute database. The person attribute database may be included inside the information processing apparatus 50, or may be included inside a server or the like capable of being accessed by the information processing apparatus 50.

The profile estimation section 502 acquires person attribute information from the person attribute database. Further, the profile estimation section 502 acquires person images from the person image database.

The profile estimation section 502 estimates a profile of each person, from the acquired person attribute information and person images. Here, a profile in the present disclosure is referred to as a set of one or a plurality of profile items, their values, and a profile image.

The profile estimation section 502 may estimate the acquired person attribute information by the profile items of this person and their values as they are, or may newly estimate profile items of this person, based on the acquired person attribute information.

As an example of newly estimating profile items of this person, based on the acquired attribute information, in the case where the "age" of this person is "twenties" in the acquired attribute information, the profile estimation section 502 can include estimating a profile item "generation" as "young".

Further, in the case where the "age" of this person is "twenties" at the time of picking up a person image group, the profile estimation section 502 can include estimating a "year of birth" of this person as "twenty years prior to the time of picking up the person image group".

Further, for example, in the case where the acquired age information is "less than 10 years old", and the sex information is "male", the profile estimation section 502 may estimate the value of a profile item integrating age and sex as "boy".

Further, the profile estimation section 502 selects one or a plurality of person images, from among the acquired person images, as a profile image. For example, the profile estimation section 502 selects a profile image at random from the acquired person images.

Further, the profile estimation section 502 can consider selecting a person image in which this person is picked-up the largest, or selecting a person image in which the outline is picked-up the clearest, from among the acquired person images.

A profile PRO' estimated by the profile estimation section 502 is stored in a profile database.

Since the profiles related to each person are integrated, it is possible for the profile PRO' stored in the profile database to set a value of some profile item of some person as a search key, and to search for values of other profile items of this person.

Note that in the case where a plurality of persons are included in a picked-up image, the person image group acquisition section 512 acquires person images by distinguishing the plurality of persons included in the picked-up image, and each of the other sections of the information processing apparatus 50 may perform the above described processes for each person image.

Heretofore, an example of a configuration of the information processing apparatus 50 related to the present embodiment has been described with reference to FIG. 1.

[1-2: Flow of Profile Estimation Based on Person Image Group Analysis (FIG. 2)]

Figure 2:
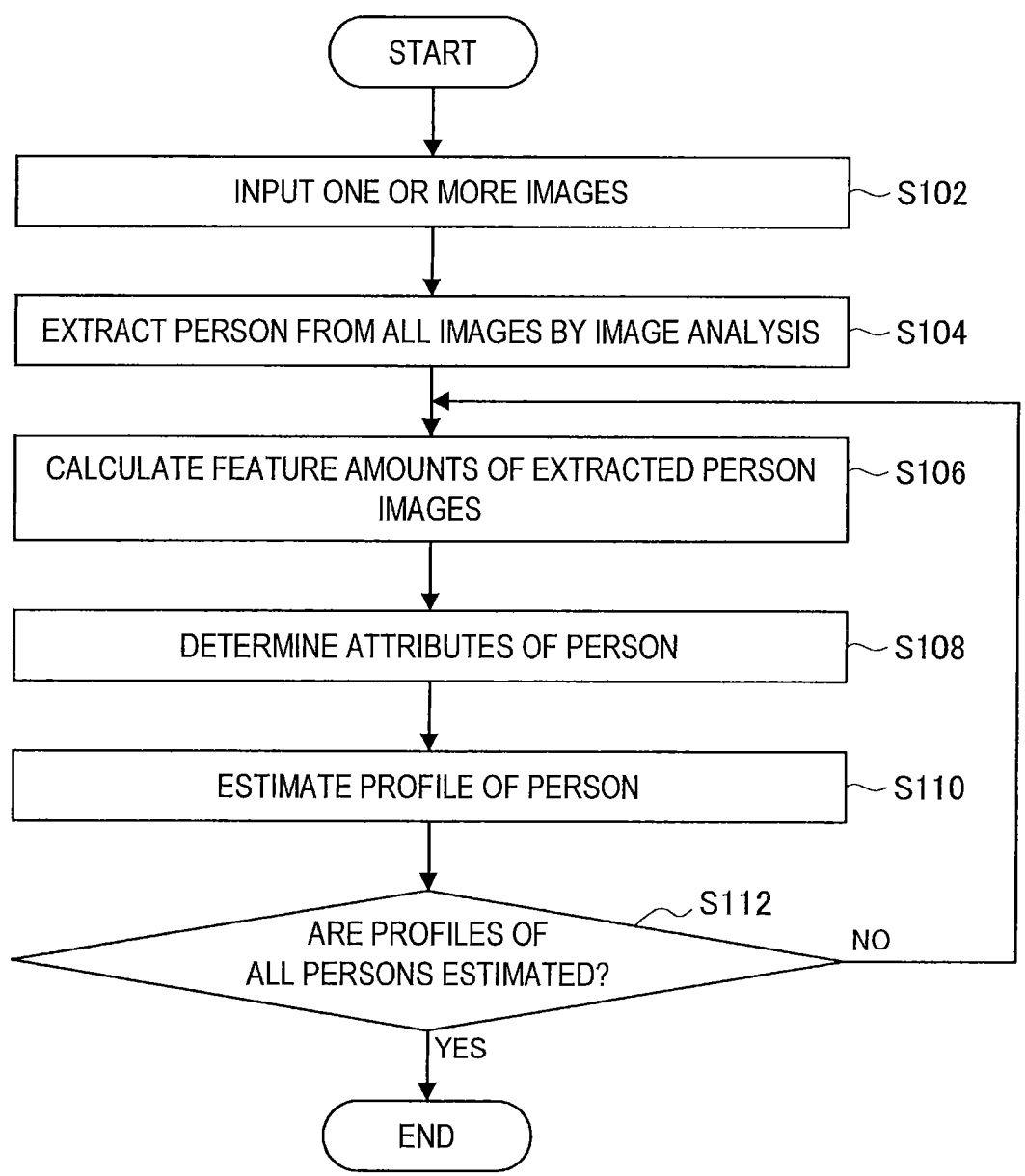
FIG. 2 is a flow chart which shows an example of a process flow performed by the information processing apparatus which performs profile estimation of a person based on person image group analysis.

Hereinafter, a process flow performed by the information processing apparatus 50 related to the present embodiment will be described with reference to FIG. 2. FIG. 2 is a flow chart which shows an example of a process flow performed by the information processing apparatus which performs profile estimation of a person based on person image group analysis.

As shown in FIG. 2, first one or a plurality of images (image groups) are input to the person image group acquisition section 512 (S102).

Next, the person image group acquisition section 512 acquires a person image group, based on the input image group, and stores the acquired person image group in the person image database (S104). For example, the person image group acquisition section 512 extracts a person included in a photographic subject of this image group, by image analyzing the input image group.

Next, the person image feature amount calculation section 514 calculates feature amounts of each person image included in the person image group acquired by the person image group acquisition section 512 (S106).

Next, the person attribute determination section 516 determines, for each person, the attributes of the person, based on the feature amounts of the person image included in the person image group of this person calculated by the person image feature amount calculation section 514, and stores the determined attributes in the person attribute database (S108).

Next, the profile estimation section 502 acquires person images and person attributes from the person image database and the person attribute database, and further estimates a profile of the person determined based on the acquired information (S110).

When the processes of the above described steps S106 to S110 are performed for all persons included in the input image group, the information processing apparatus 50 ends the series of processes (S112).

Heretofore, an example of the process flow performed by the information processing apparatus 50 related to the present embodiment has been described with reference to FIG. 2.

<2: Basic Configuration of the Information Processing Apparatus 10 (Image Analysis+Event Information; FIGS. 3 to 10)>

Figure 3:
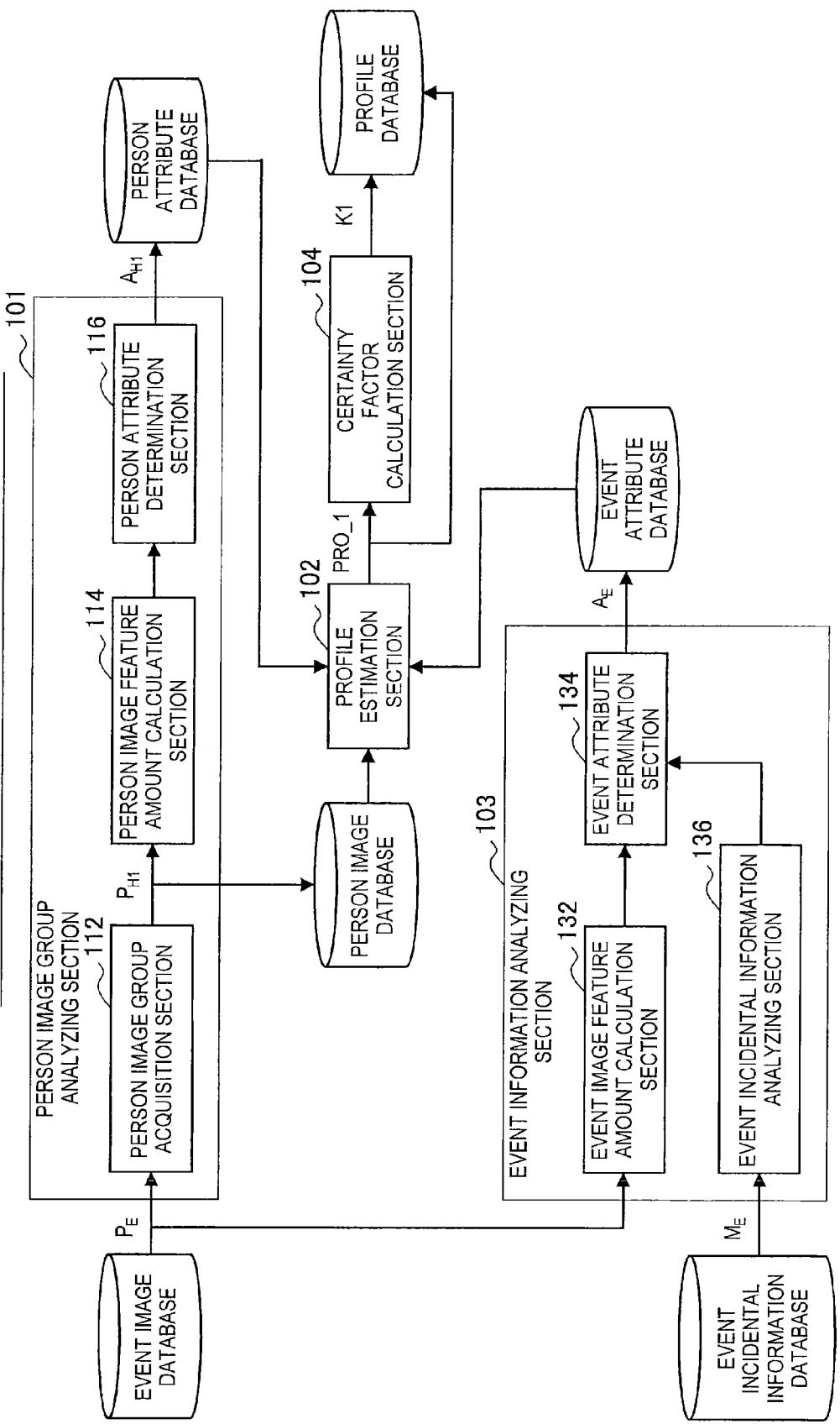
FIG. 3 is an explanatory diagram for describing an information processing apparatus according to a basic configuration of a first embodiment of the present disclosure.

Hereinafter, a basic configuration of the information processing apparatus 10 will be described with reference to FIG. 3. FIG. 3 is an explanatory diagram for describing a basic configuration of the information processing apparatus according to the present embodiment. Note that the basic configuration shown in FIG. 3 is an example, and may omit, add, or modify part of the components.

(Outline)

The technology according to the present embodiment relates to a method which estimates a profile of a person participating in an event, from event information including event images picked-up at the time of the event, and event incidental information such as an event location or an event title.

As shown in FIG. 3, the information processing apparatus 10 mainly includes a person image group analyzing section 101, a profile estimation section 102, an event information analyzing section 103, and a certainty factor calculation section 104.

The person image group analyzing section 101 acquires a person image from the input event image, analyzes the acquired person image, and determines attributes of a picked-up person. The event information analyzing section 103 analyzes the input event image and event incidental information, and determines attributes of the picked-up event.

The profile estimation section 102 estimates a profile of this person, based on the person attributes determined by the person image group analyzing section 101, and the event attributes determined by the event information analyzing section 103. The certainty factor calculation section 104 calculates a certainty factor for each profile item estimated by the profile estimation section 102. A definition of a certainty factor will be described later.

(Details)

Figure 4:
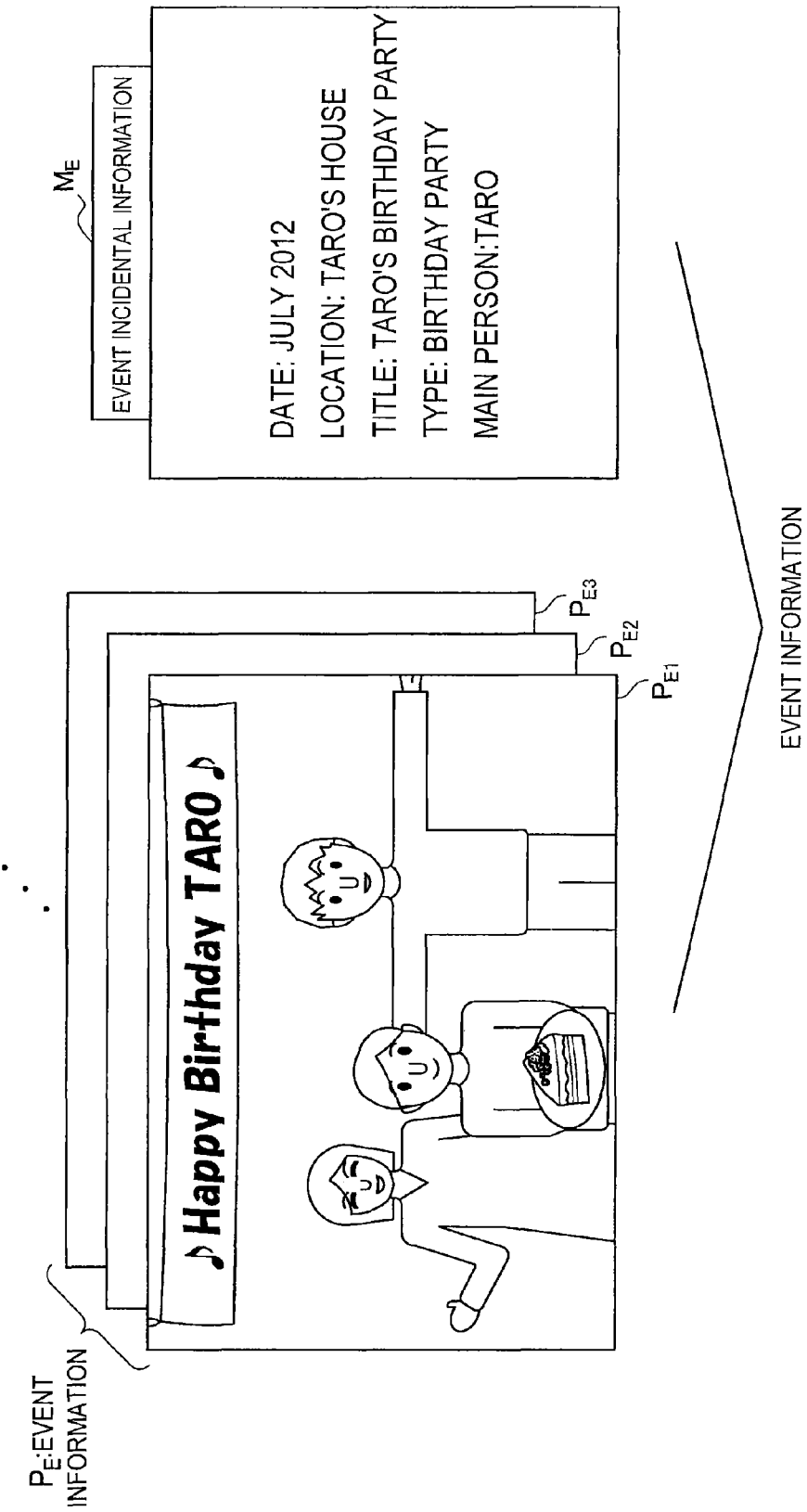
FIG. 4 is an explanatory diagram for describing event information according to the first embodiment.

Event information is input to the information processing apparatus 10. As shown in FIG. 4, the event information includes an event image group $P_E$ and event incidental information $M_E$.

The event image group $P_E$ compiles event images $P_{E1}$, $P_{E2}$, $P_{E3}$, and the like picked-up at the same event as one group. Further, the event incidental information includes event incidental items and their values, such as event date, event location, event title, event type, and event main person's name.

The event image group $P_E$ is input to the person image group acquisition section 112 of the person image group analyzing section 101, and the event image feature amount calculation section 132 of the event information analyzing section 103. Further, the event incidental information is input to the event incidental information analyzing section 136 of the event information analyzing section 103.

Hereinafter, first the processes performed by the person image group analyzing section 101 will be described in detail. The person image group analyzing section 101 includes a person image group acquisition section 112, a person image feature amount calculation section 114, and a person attribute determination section 116.

The person image group analyzing section 101 performs processes similar to those of the previously described person image group analyzing section 501 of the information processing apparatus 50. An image group from an image database, which includes various types of images, is input to the previously described person image group acquisition section 512 of the person image group analyzing section 501. The event image group $P_E$ from an event image database, which includes event images, is input to the person image group acquisition section 112 of the person image group analyzing section 101.

In the case where the event image group $P_E$ input to the person image group acquisition section 112 includes picked-up images which also include photographic subjects other than persons, the person image group acquisition section 112 functions as a person image extraction section which extracts a person image group, which is a part in which persons are included, from the input event image group $P_E$.

In the case where a plurality of persons are included in one event image, the person image group acquisition section 112 acquires a person image for each of the persons. For example, as shown in FIG. 5, in the case where three persons are included in the event image $P_{E1}$, the person image group acquisition section 112 acquires three person images $P_{H1A}$ to $P_{H1C}$ from the one event image $P_{E1}$.

Note that when acquiring the person images, one or all of these processes may be manually performed. Further, the person images acquired by the person image acquisition section 112 may be manually corrected.

Further, the person image group $P_{H1}$ acquired by the person image group acquisition section 112 is stored in a person image database. The person image database may be included inside the information processing apparatus 50, or may be included inside a server or the like capable of being accessed by the information processing apparatus 50.

Note that the person image group acquisition section 112 may acquire the person image group from a database or the like, which has stored in advance person image groups, in which the person parts of the event image group are extracted.

The person image group $P_{H1}$ acquired by the person image group acquisition section 112 is input to the person image feature amount calculation section 114. When the person image group $P_{H1}$ is input, the person image feature amount calculation section 114 calculates feature amounts of each person image included in the person image group $P_{H1}$.

The calculated feature amounts are used by the person attribute determination section 116, which is described later, for determining attributes of a person. For example, the person attribute determination section 116 calculates the positions of a plurality of points on the line of the eyelids of a person as a feature amount, and calculates the shape of the eyelids based on the calculated positions of the plurality of points on the line of the eyelids as a feature amount.

Figure 6:
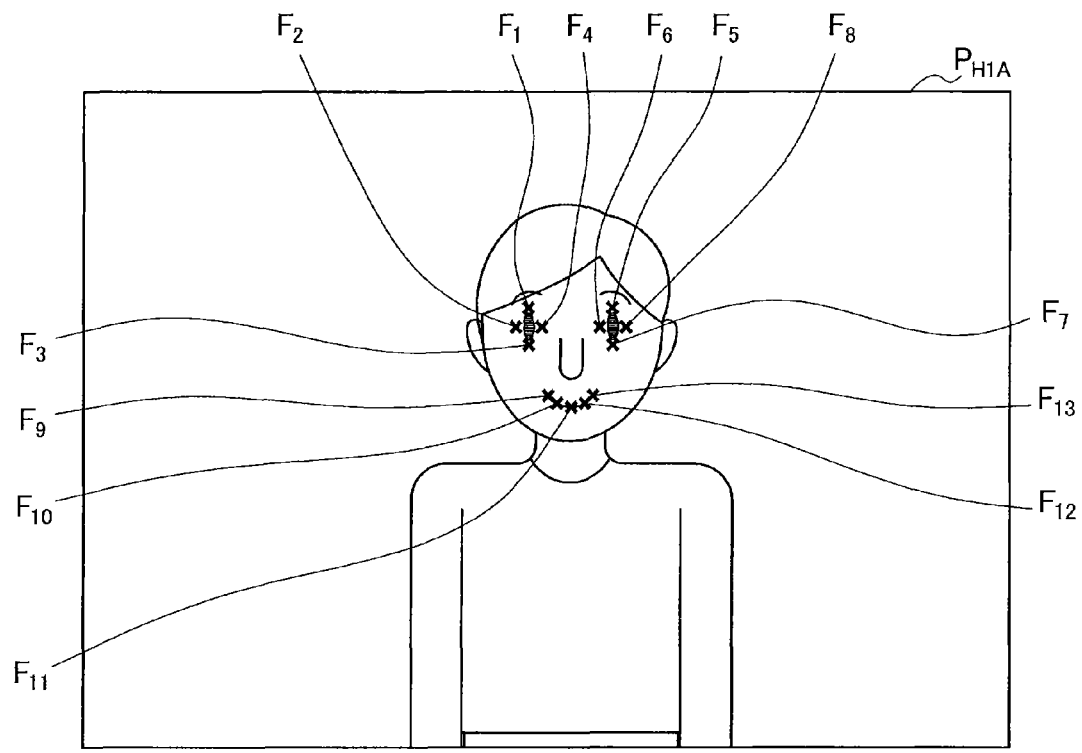
FIG. 6 is an explanatory diagram for describing an example of the processes performed by a person image feature amount calculation section according to the first embodiment.

For example, as shown in FIG. 6, the person image feature amount calculation section 114 first detects feature points $F_1$ to $F_{13}$ on the line of the eyes and on the line of the lips. Next, the person image feature amount calculation section 114 calculates feature amounts from the positions of the detected feature points $F_1$ to $F_{13}$, the distance between the feature points, or the like.

Further, the feature amounts are not limited to those based on position detection of feature points such as described above. For example, the person image feature amount calculation section 114 may detect a face region, and thereafter calculate the feature amounts which show a color or the like of the detected face region.

The feature amounts of each person image calculated by the person image feature amount calculation section 114 are input to the person attribute determination section 116. The person attribute determination section 116 determines the attributes of the person corresponding to this person image group, based on the feature amounts of the person image included in each input person image group.

Hereinafter, a method which determines attributes of a person from one person image will first be described.

The attributes of a person are, for example, the sex, age, or the like of this person. The age of a person may be calculated by setting age brackets having prescribed ranges as candidates, such as "teenager", "twenties" or the like. Person attribute information, such as "sex" is "male" and "age" is "thirties", for example, is output from the person attribute determination section 116.

Further, each attribute of a person may be expressed by a numerical value. For example, expressing the "possibility a person is male" by a numerical value can be considered for "age". That is, it is possible to make expressions, so that in the case where the "possibility a person is male is 100%", the value of the attribute "age" is set to "1", and in the case where the "possibility a person is female is 100%", the value of the attribute "age" is set to "0".

For example, creating in advance a model of the feature amounts corresponding to the person images of each age, from a plurality of persons images of a person in which his or her age is known, and comparing an input person image with the model of the feature amounts in the case of each age, can be considered for a person attribute determination method based on person images.

For example, as shown in FIG. 7, the feature amounts of a person image $P_{H1A}$ input to the person attribute determination section 116 are compared with a model of the feature amounts of a person image group $P_{H\_20}$ of a person in his or her "twenties". On the other hand, the feature amounts of the person image $P_{H1A}$ input to the person attribute determination section 116 are compared with a model of the feature amounts of a person image group $P_{H\_30}$ of a person in his or her "thirties".

The person attribute determination section 116 determines the age having feature amounts nearest to those of the input person image $P_{H1A}$ to be the age of the person of the person image.

The similarity of the person image $P_{H1A}$ to the model of the person image group of each age is expressed, for example, by the shortness of the distance between feature vectors made by the values of each feature amount. As shown in the example of FIG. 7, in the case where the input person image $P_{H1A}$ has feature amounts of values nearest to the feature amounts of the model of feature amounts for "thirties", the person attribute determination section 116 determines the age of the person of the person image $P_{H1A}$ to be "thirties".

Heretofore, a method which determines person attributes from one person image has been described.

In the case where a person image group includes a plurality of person images, person attributes can be determined, for example, from the entire person image group by the following two methods.

The first method is a method in which the person attribute determination section 116 calculates representative values (for example, mean values or the like) of the feature amounts of the plurality of person images, performs the above described processes for the calculated representative values, and determines the attributes of a person.

Further, the second method is a method in which the person attribute determination section 116 determines person attributes from each of the plurality of person images, and by using this result, determines the attributes of a person, which are finally used, as an entire person image group.

For example, using these person attributes as a result determined from an entire person image group, at the time when the person attributes determined from a number of person images not less than a prescribed number are the same, from among the person images included in a person image group, can be considered as a specific example of the above described second method.

As described above, by using this person attribute determination result only in the case where a number of person attribute determination results not less than a prescribed number are obtained, it becomes possible to acquire a result with a higher reliability.

Further, for example, using a maximum value for each person attribute, from among the values of the person attributes determined from each person image included in the person image group, as a result determined from an entire person image group, can be considered as a specific example of the above described second method.

The person attribute information determined for each person image group by such methods is stored in the person attribute database. Note that the person attribute database may be included inside the information processing apparatus 10, or may be included inside a server or the like capable of being accessed by the information processing apparatus 10.

Note that the person attributes acquired by the person attribute determination section 116 may be manually corrected.

Heretofore, the processes performed by the person image group analyzing section 101 have been described.

Next, the processes performed by the event information analyzing section 103 will be described. As shown in FIG. 3, the event information analyzing section 103 includes an event image feature amount calculation section 132, an event attribute determination section 134, and an event incidental information analyzing section 136.

An event image group $P_E$ from the event image database is input to the event image feature amount calculation section 132. When the event image group $P_E$ is input, the event image feature amount calculation section 132 calculates the feature amounts of each event image.

Note that the feature amounts of the event images are used when the event attribute determination section 134, which is described later, determines attributes of an event, and are, for example, feature amounts which show the shape, pattern, color or the like of objects included in an event image.

In this way, the feature amounts of each event image calculated by the event image feature amount calculation section 132 are input to the event attribute determination section 134.

On the other hand, the event incidental information from the event incidental information database is input to the event incidental information analyzing section 136. Here, FIG. 8 is an explanatory diagram for describing an example of event incidental information. As shown in FIG. 8, the event incidental information is, for example, "event date", "event location", "event title", "event type", "event main person" or the like.

Note that the event incidental information may be directly provided for each event by a user of the information processing apparatus 10, or may be estimated from other event incidental information or the like input by the information processing apparatus 10.

The value of the "event date" is not just a value which shows a prescribed date such as "Nov. 10, 2011", but may also be, for example, a value which shows a prescribed time period, such as "January 2012". The value of the "event date" may be input by the user, or may be provided to an event image when the event image is picked-up by an image pickup apparatus.

The value of the "event location" is, for example, "A hotel", "Taro's house" or the like. The value of the "event location", similar to that of the "event date", may be input by the user, or may be provided to an event image when the event image is picked-up by an image pickup apparatus.

The value of the "event title" is provided by the user according to the contents of the event. For example, there are cases where the value is provided according to the event contents, such as "B University OB association" or "Taro's birthday party", and there are cases where the value is provided according to a time period and location of an event other than that of the event contents, such as "2012 Kyoto holiday" or the like.

The value of the "event type" is a classification of the event according to the contents or the like of the event, such as "birthday party" or the like. Further, in the case where there is a main person of an event such as a birthday party, a specific person's name such as "Taro" is the value of the "event main person's name". Further, in the case where there is no main person of an event such as an OB association, there will be no value of the "event main person's name".

Further, it is possible for the event incidental information analyzing section 136 to convert the input "event title" into values of other event incidental items, such as "event date", "event location", "event main person's name", and "event type", by morphological analysis or the like.

For example, as shown in FIG. 8, in the case where "Taro's birthday party" is input as the "event title", the event incidental information analyzing section 136 sets the value of the "event main person's name" as "Taro", and sets the value of the "event type" as "birthday party".

As described above, there are cases where the event incidental information analyzing section 136 outputs the input event incidental information as it is, and there are cases where the event incidental information analyzing section 136 outputs the input event incidental information by converting it into other event incidental information.

The event incidental information analyzed by the event incidental information analyzing section 136 is input to the event attribute determination section 134.

Further, the event incidental information analyzed by the event incidental information analyzing section 136 may be able to perform verifications and corrections by the user.

The feature amounts of each event image calculated by the event image feature amount calculation section 132 are input to the event attribute determination section 134. Further, the event incidental information analyzed by the event incidental information analyzing section 136 is also input to the event attribute determination section 134.

Here, in the case where an event image group $P_E$ includes a plurality of event images, the event attribute determination section 134 calculates, for example, representative values (for example, mean values or the like) of the feature amounts of the plurality of event images, and uses the calculated representative values as the feature amounts of the event image group $P_E$.

The event attribute determination section 134 determines event attributes, based on the input feature amounts of the event image group $P_E$ and the input event incidental information $M_E$.

The event attribute determination section 134 determines, for example, the event attribute information "event type" from the feature amounts of the event image group $P_E$, by recognizing a prescribed object included in the event image group $P_E$.

For example, in the case where there is a person in common centered in many images included in the event image group $P_E$, and "cake" is recognized, the event attribute determination section 134 can consider setting the value of the event attribute information "event type" to "birthday party".

Further, for example, in the case where many persons who are standing are included in the event image group $P_E$, and a lot of these persons have glasses and plates, the event attribute determination section 134 can consider setting the value of the event attribute information "event type" to "standing party".

Further, the event attribute determination section 134 may use event images in which the values of the event attribute information, such as "event name", "event type", "event main person", "event date", or "event location", are already known. It is possible to estimate the values of the event attribute information, such as "event name", "event type", "event main person", "event date", or "event location", of an input event, by comparing the feature amounts of an event image in which the values of the event attribute information are already known, with the feature amounts of the event images which are included in the input event image group $P_E$.

The event attribute determination section 134 calculates, for example, the distances between feature vectors which include the feature amounts of event images in which the attributes are already determined, and a feature vector which includes the feature amounts of the input event image group $P_E$. Then, the event attribute determination section 134 determines the attributes of an event image, which has a distance to the input event image which is the shortest, to be the event attributes of the input event image.

Further, the event attribute determination section 134 determines the event attributes, based on the event incidental information input from the event incidental information analyzing section 136.

The event attribute determination section 134 may set the event incidental information as the event attributes as it is. Further, in the case where the value of the event incidental information "event location" is "Tokyo Prefecture, Minato Ward, xxx District, xxx City Block No. xxx", for example, the event attribute determination section 134 may convert the value of the event attribute information "event location" to "Tokyo Prefecture".

By using event attributes, which conceptualize and reclassify such event incidental information in a higher level, for profile estimation of a person, it becomes possible to perform estimation of the profile with items a user wants to acquire.

The attributes obtained by one-to-one correspondence with event information, such as "event title", "event type", "event main person's name", "event date", or "event location", or by matching and semantically analyzing this event information, are also included in the event attributes.

For example, if there is an event over a long period of time at a location other than one's home at the year-end and new-year holidays, the event attribute determination section 134 may determine the value of the event attribute information "event type" as "homecoming".

Further, the event attribute determination section 134 may determine the event incidental information as event attributes, only in the case where consistency of the input event image feature amounts and event incidental information is ensured.

For example, in the case where the "event location" of the input event incidental information is "school", even though the "event location" is "home" when determined from the input event image feature amounts, since there is a high possibility that one of them is incorrect, the event attribute determination section 134 may set the value of the "event location", from among the event attributes, to "none".

An event attribute $A_E$ determined by the event attribute determination section 134 is stored in the event attribute database.

Note that the event attribute $A_E$ acquired by the event attribute determination section 134 may be manually corrected.

Heretofore, the processes of the event information analyzing section 103 have been described.

Hereinafter, the processes performed by the profile estimation section 102 will be described. The profile estimation section 102 first acquires a person image group from the person image database. Further, the profile estimation section 102 acquires person attribute information from the person attribute database. In addition, the profile estimation section 102 acquires event attribute information from the event attribute database.

The profile estimation section 102 estimates a profile of a person, by using the acquired person image group, person attribute information, and event attribute information. Here, as described above, a profile in the present disclosure is referred to as a set of one or a plurality of profile items, their values, and a profile image.

Note that the values of the profile items are not limited to numerical values, and may include text.

The profile estimation section 102 selects one or a plurality of person images, from among the person images included in the input person image group, as a profile image. For example, the profile estimation section 102 selects a profile image at random from the person images included in the acquired person image group.

Further, the profile estimation section 102 may select a person image in which this person is picked-up the largest, or may select a person image in which the outline is picked-up the clearest, from among the person images included in the acquired person image group.

Further, the profile estimation section 102 estimates the values of each profile item, based on the input person images, person attribute information, and event attribute information.

FIG. 9 is an explanatory diagram which shows an example of profile items and their values estimated by the profile estimation section 102. As shown in FIG. 9, the profile items are "name", "sex", "age", "place of residence", "hometown", "date of birth", "alma mater", "workplace", or the like.

In addition to estimating a profile of this person from the person attribute information similar to that of the profile estimation section 502, the profile estimation section 102 estimates the "name", "birthday", "hometown", "place of residence" or the like which can only be known by the event.

For example, the case where, as input event attribute information, the "event title" is "Taro's birthday party", the "event main person's name" is "Taro", the "event type" is "birthday party", and the "event date" is "July 2011", will be described.

The profile estimation section 102 first determines which person included in the person image group is the "event main person's name", by analyzing the person images.

For example, the profile estimation section 102 determines the person included the most times in the person image group to be the "event main person's name".

Further, for example, the profile estimation section 102 may estimate the profile item "name" of the person who occupies the greatest amount of area in the person image group to be the value of the event attribute "event main person's name".

Further, for example, the profile estimation section 102 may estimate the profile item "name" of the person who is included with the greatest frequency in a prescribed range in the person images (for example, in the vicinity of the center of the person images) to be the value of the event attribute "event main person's name".

When the profile estimation section 102 determines whether or not any person included in person image group is the "event main person's name", the profile estimation section 102 may also estimate the profile item "name" of the person who is the "event main person's name" as the value of the event attribute "event main person's name".

For example, in the case where the "event main person's name" is "Taro", the profile estimation section 102 may estimate the "name" of the person included in the person image group determined to be the "event main person's name" as "Taro", from the value "Taro" of the event attribute "event main person's name".

In addition, the profile estimation section 102 estimates the "birthday" of the person whose "name" is estimated to be "Taro" to be "July", by considering that the "event type" is "birthday party" and the "event date" is "July 2011".

Further, the profile estimation section 102 references the profile of the person corresponding to the "event main person's name" from the profile database, which is the result of estimating the profile of each person in other events, and in the case where the value of the profile item (for example, "birthday") on the referenced profile matches the value of the profile item (for example, "birthday") estimated from the event performed by the present process, it is possible for the profile estimation section 102 to estimate a narrower estimate range for this profile item (for example, "birthday").

For example, an event occurs each year around July, which has the event name "Taro's birthday party". In this case, it is understood that the "birthday" of the person whose "name" is "Taro" is "from the end of June to the beginning of July", from "Taro's birthday party" which has occurred before this.

On the other hand, the profile estimation section 102 determines the "birthday" of the person whose "name" is "Taro" is "from the beginning of July to the middle of July", from the event analysis of "Taro's birthday party" input at present.

In this case, the profile estimation section 102 integrates the information of "Taro's birthday party" which has occurred before this and the information of "Taro's birthday party" input at present, and it is possible for the profile estimation section 102 to perform estimation again in a more narrower time period, such as the "birthday" of the person whose "name" is "Taro" is "the beginning of July".

In only the case where some event attributes (hereinafter, event attribute A) are a prescribed value, values of other event attributes (hereinafter, event attribute B) become prescribed values, the profile estimation section 102 may estimate the values of prescribed profile items, by relating the event attribute A with the event attribute B.

Hereinafter, the case where the above described event attribute A is "event type" and the above described event attribute B is "event location", and the profile items "hometown" and "place of residence" are estimated, will be described.

For example, a case in which the "event location" is "Tokyo" for other events, but the "event location" is "Osaka" only in the case where the "event type" is "homecoming", will be considered. In this case, the profile estimation section 102 estimates the "hometown" of the person who performed image pickup to be "Osaka", and estimates the "place of residence" of the person to be "Tokyo".

Further, in the case where prescribed event attributes are prescribed values, the profile estimation section 102 may estimate the values of the prescribed profile items of the person participating in this event as the prescribed values.

For example, in the case where the "event title" is "AAA University OB association", the profile estimation section 102 can consider estimating the value of the profile item "alma mater" of the persons participating in the event to be "AAA University". Further, for example, in the case where the "event type" is "women's association", the profile estimation section 102 can consider estimating the value of the profile item "sex" of the persons participating in the event as "female".

As described above, a profile PRO_1 estimated by the profile estimation section 102 is stored in the profile database. Further, this profile PRO_1 is input to the certainty factor calculation section 104. Note that information related to each profile item estimation method is also input to the certainty factor calculation section 104.

As described above, each profile item estimation method includes, for example, a method which estimates the values of the profile items by analyzing the event images, a method which estimates the values of the profile items based on the event incidental information input manually by a user, a method which estimates the values of the profile items based on the event incidental information provided automatically by an image pickup apparatus, and a combination of these methods.

The certainty factor calculation section 104 calculates a certainty factor for each profile item estimated by the profile estimation section 102. Here, a certainty factor in the present disclosure refers to an index for the certainty of the values of each profile item of the profile PRO_1, for each person estimated by the profile estimation section 102, matching the values of the actual profile items of these persons.

The certainty factor calculation section 104 calculates a certainty factor of each estimated profile item, according to information related to the estimation method of each profile item.

While the value of the certainty factor may be a continuous value or a discrete value, it is necessary for the value to be an index which reflects the reliability of the profile item estimation method. For example, since the reliability of information can be considered to be high for profile items estimated based on the event incidental information input manually by the user, the certainty factor calculation section 104 calculates a high reliability factor for these profile items.

Further, for example, since the possibility of information being incorrect can be considered to be low for profile items estimated based on time information and position information provided automatically by an image pickup apparatus, the certainty factor calculation section 104 calculates a high reliability factor for these profile items.

On the other hand, for example, since the profile items estimated by event image analysis have a reliability which can be considered to be low compared to that of the information input manually by the user, the certainty factor calculation section 104 calculates a certainty factor of the profile items estimated by event image analysis which is lower than the certainty factor of the profile items based on information input manually by the user.

Note that each profile item, the values of these profile items, and the certainty factors of these profile items are shared between each event. That is, the information processing apparatus 10 changes the values of the input profile items of the persons participating in the event, and changes the certainty factors of these profile items while the values of the profile items are not changed, every time event information is input to the information processing apparatus 10.

For example, from the information of some event A, the certainty factors of some profile items of the persons participating in this event A are lowered. In this case, the information of another event B after this is input to the information processing apparatus 10, and at the time when the values of these profile items by event A kept in a database match an estimation result of the values of the profile items by event B, the certainty factors of these profile items are set higher than the values when calculating from only event A.

Further, the certainty factor calculation section 104 may calculate the certainty factors of other profile items, according to the values of some profile items from among the profile items.

For example, from an image of a person who is of a young age, such as a baby or child, the determination accuracy for the sex of this person can be considered to be bad. Accordingly, the certainty factor calculation section 104 calculates, for example, the certainty factor of the profile item "sex" to be low, for persons estimated to have a value of the profile item "age" lower than a prescribed value, by analyzing a person image group.

FIG. 10 is an explanatory diagram for describing certainty factors of profile items. FIG. 10 is an example which details profile items of some person, the values of these profile items, and the certainty factors of these profile items.

For example, the profile item "alma mater" is "AAA University", and since this profile item is estimated based on event attributes using the event incidental information input manually by the user as it is, the certainty factor of this profile item is set to "95".

Further, for example, the profile item "name" is "Yamada Taro", and since this profile item is estimated based on event attributes converted from the event incidental information input manually by the user, the certainty factor of this profile item is set to "70".

Further, for example, the profile item "sex" is "male", and since this profile item is estimated by analyzing person images, the certainty factor of this profile item is set to "30".

A certainty factor K1 calculated by the certainty factor calculation section 104 is stored in the profile database.

The profiles of each person estimated by the profile estimation section 102 and the certainty factors for each of the profile items are shared between a plurality of events.

Heretofore, an example of the basic configuration of the information processing apparatus 10 according to the present embodiment has been described with reference to FIGS. 3 to 10.

According to the present embodiment as described above, a profile of a person participating in an event is estimated, based on an input event image group.

In particular, by analyzing the event image group, it becomes possible to estimate values for profile items not capable of being estimated from only the person image group, and to perform profile estimation with a higher accuracy.

Further, according to the present embodiment, it becomes possible to save time when an owner of an event image group inputs the profiles of every person himself or herself, and to perform assistance to the profile input by presenting the profiles estimated when being input as predictive values.

Further, according to the present embodiment, since the estimated profiles and certainty factors are shared among a plurality of events, it becomes possible to perform estimation of the profiles more accurately, by estimating the profiles from one event.

Further, according to the present embodiment, it is possible to estimate the profiles of persons who were not noticed by the owner of the event image group himself or herself. For example, this can be considered to lead to new findings with regards to the hobbies or likes of a person other than the owner included in the event image group.

<3: Modified Example (Image Analysis+Event Information+Web Site Information)>

[3-1: Configuration of the Information Processing Apparatus According to the Modified Example (FIG. 11)]

The above described basic configuration is a configuration which estimates the profiles of persons participating in an event, based on event information analysis and person image group analysis.

The present modified example is a configuration which adds a web site information integration section 105 to this basic configuration. In the present modified example, a profile estimated by the above described basic configuration is updated based on information from a web site.

Figure 11:
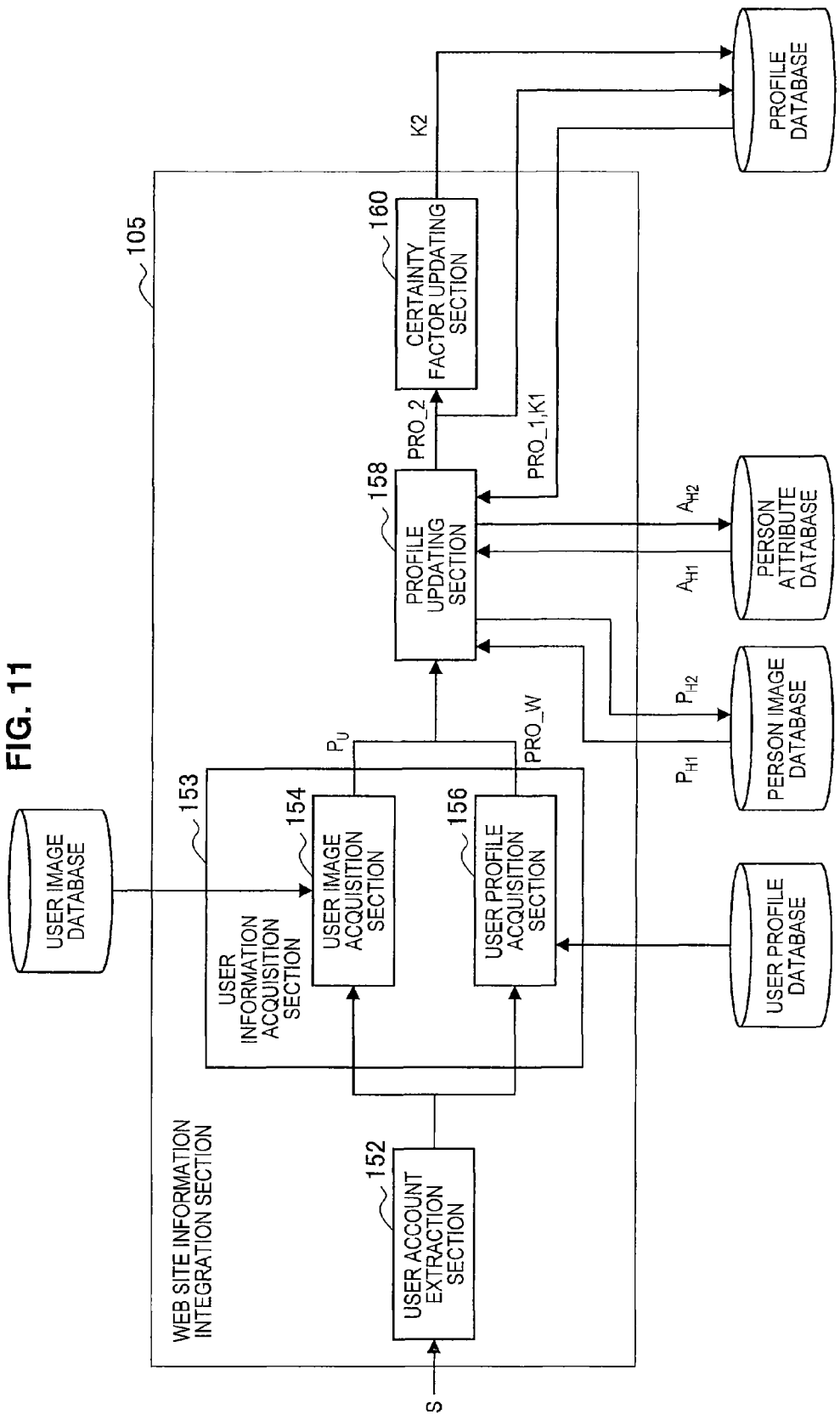
FIG. 11 is an explanatory diagram for describing an information processing apparatus according to a modified example of the first embodiment.

Hereinafter, the modified example according to the present embodiment will be described with reference to FIG. 11. FIG. 11 is an explanatory diagram for describing an entire configuration of the present modified example. However, the following description presupposes that the images of each person participating in the event are stored in the person image database, the person attribute information of each person is stored in the person attribute database, and the profiles of each person are stored in the profile database, by the above described basic configuration.

The web site information integration section 105 includes a user account extraction section 152, a user information acquisition section 153, a profile updating section 158, and a certainty factor updating section 160. Further, the user information acquisition section 153 includes a user image acquisition section 154, and a user profile acquisition section 156.

One or a plurality of pieces of web site information S, which are related to community type web sites sharing information between users via a network, such as an SNS (Social Network Service), are input to the user account extraction section 152. The web site information includes, for example, account information of some user, and account information of other users who share information on the web site with this user.

The user account extraction section 152 extracts one or a plurality of user accounts, based on the input web site information S. For example, the user account extraction section 152 extracts an account of a user who inputs information himself or herself, and accounts of other users who share information on the web site with this user.

The extracted user accounts are input to the user image acquisition section 154 and the user profile acquisition section 156.

When the user accounts are input, the user image acquisition section 154 of the user information acquisition section 153 acquires user images corresponding to each input user account from a user image database. A user image is, for example, a profile image uploaded by a user, and which is displayed on a page corresponding to this user account on the web site.

Further, the user image acquisition section 154 may acquire person images, in which this user part is extracted, as a user image from the event images uploaded by the user.

A user image $P_U$ acquired by the user image acquisition section 154 is input to the profile updating section 158.

On the other hand, when a user account from the user account extraction section 152 is input, the user profile acquisition section 156 of the user information acquisition section 153 extracts a profile of the user corresponding to this user account from the user profile database. The user profile items are, for example, "user name", "birthday", "hometown", "place of residence", "hobbies", "alma mater", "workplace" or the like.

A user profile PRO_W extracted by the user profile acquisition section 156 is input to the profile updating section 158.

The profile updating section 158 updates the profile database, based on the input user image $P_U$ and user profile PRO_W. Further, the profile updating section 158 also updates the person image database and the person attribute database, based on the input user image $P_U$ and user profile PRO_W. The details of the processes performed by the profile updating section 158 will be described later.

A profile PRO_2 updated by the profile updating section 158 is input to the certainty factor updating section 160.

When the profile PRO_2 is input, the certainty factor updating section 160 updates the certainty factors of the input profile items. Since the user profile of a web site such as an SNS is input by the user himself or herself, the reliability can be considered to be high.

Accordingly, for example, in the case where the values of the profile items estimated by the profile estimation section 102 match the values of the user profile items of the web site, the certainty factor updating section 160 updates the certainty factors so that the certainty factors of these values become higher than the certainty factors of the values calculated by the certainty factor calculation section 104.

On the other hand, for example, in the case where the values of the profile items estimated by the profile estimation section 102 do not match the values of the user profile items of the web site, the certainty factor updating section 160 updates the certainty factors so that the certainty factors of these values become lower than the certainty factors of the values calculated by the certainty factor calculation section 104.

The certainty factors of the profile database are updated from K1 to K2.

Heretofore, the entire configuration of the modified example according to the present embodiment has been described with reference to FIG. 11.

[3-2: Processes Performed by the Profile Updating Section 158]

Hereinafter, the processes performed by the profile updating section 158 will be described in more detail with reference to FIGS. 12 and 13. In particular, a collation method of the users of the web site and the persons participating in an event will be described.

(3-2-1: Profile Updating Method Using Images (FIG. 12))

Hereinafter, a first method, which collates each person stored in the person image database and each user of the web site, will be described with reference to FIG. 12.

For example, the profile updating section 158 compares the feature amounts between each person image $P_H$ and each user image $P_U$ by feature vectorizing the feature amounts, and associates each person image $P_H$ with a user image $P_U$ having feature amounts nearest to those of the person image $P_U$. In this way, an association between persons and users is performed.

As shown in FIG. 12, the profile updating section 158 associates a person of a person image $P_{H1A}$, and a user of a user image $P_{UA}$ having the most similar features, as the same person.

After this, the profile updating section 158 updates the profile of the person of the person image $P_{H1A}$ with the user profile of the user of the user image $P_{UA}$.

(In the Case where the Values of Profile Items Match)

The profile updating section 158 stores the values of these profile items in the profile database as they are, and outputs these values to the certainty factor updating section 160.

(In the Case where the Values of Profile Items do not Match)

For example, the profile updating section 158 substitutes the values of the profile items estimated by the profile estimation section 102 with the values of the user profile items of the web site. Generally, a user profile kept by the web site is input by the user himself or herself, and the reliability can therefore be considered to be high.

However, the profile updating section 158 may perform updating of the profiles by prioritizing the values of the profile items estimated by the profile estimation section 102 over the values of the user profile items of the web site, according to the reliability or the like of the information of the web site.

(In the Case where there are Profile Items Obtained from Only the Web Site)

For example, in the case where there are user profile items capable of acquiring values from only the web site, the profile updating section 158 adds the profile items and their values acquired from the web site to the profile items estimated by the profile estimation section 102.

Heretofore, a first method, which collates each person stored in the person image database and each user of the web site, has been described with reference to FIG. 12.

(3-2-2: Profile Updating Method Using Certainty Factors (FIG. 13))

Hereinafter, a second method, which collates each person stored in the person image database and each user of the web site, will be described with reference to FIG. 13.

Figure 13:
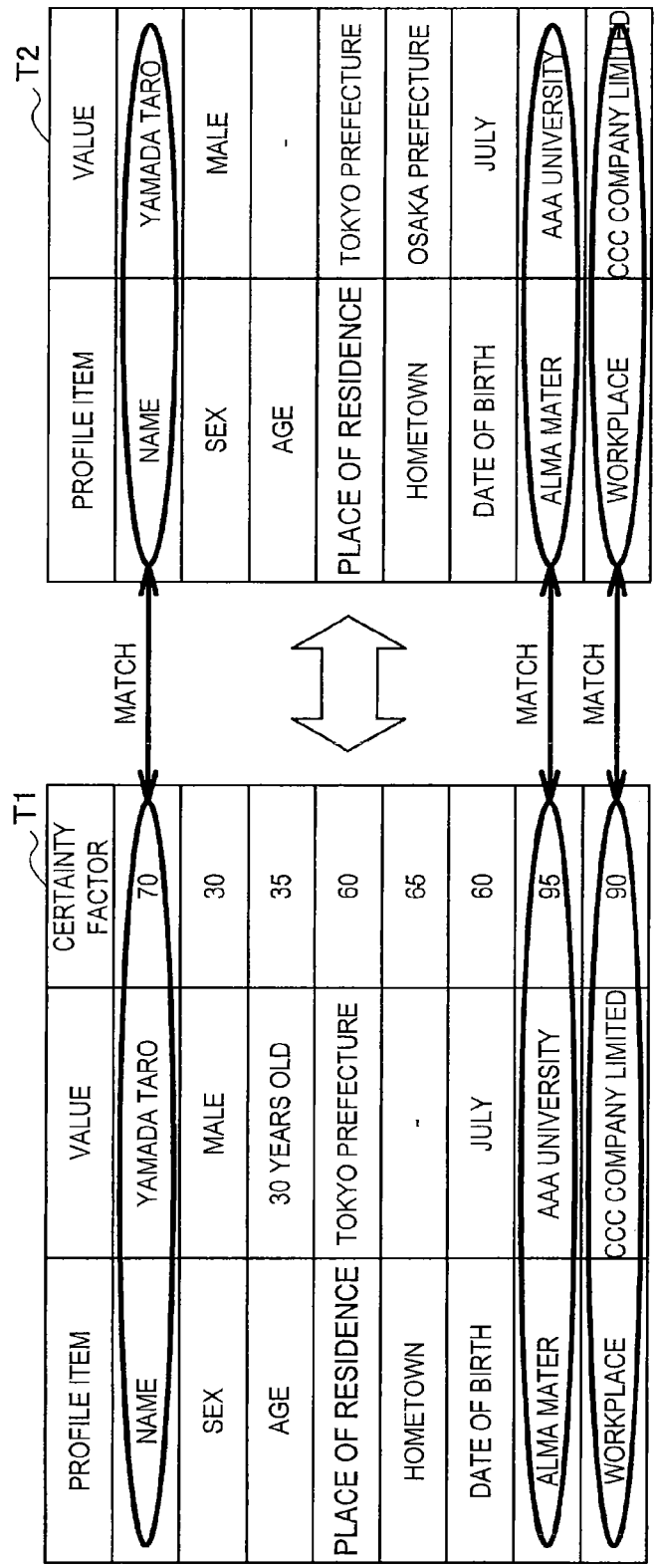
FIG. 13 is an explanatory diagram for describing the modified example according to the first embodiment.
Figure 14:
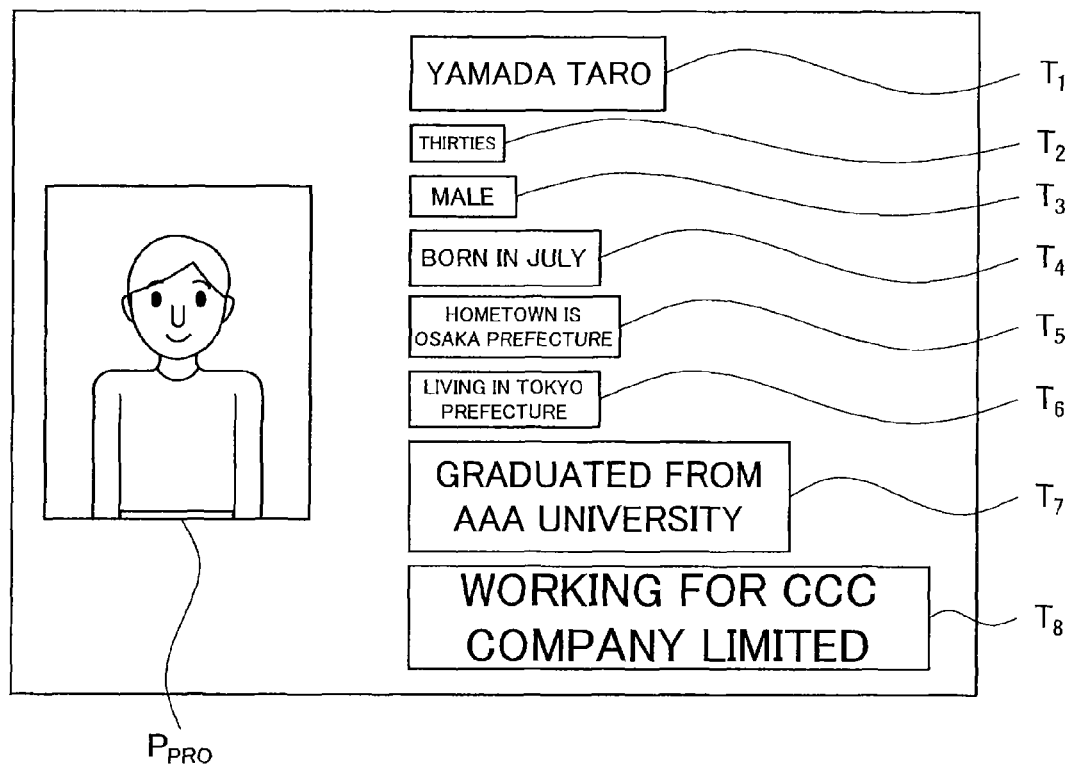
FIG. 14 is an explanatory diagram for describing a first application example according to the first embodiment.

A profile of a person, which is estimated by the profile estimation section 102, and certainty factors extracted by the certainty factor calculation section 104 are expressed such as those in Table T1 of FIG. 13. Further, profile items of a user and their values, which are extracted by the user profile acquisition section 156, are expressed such as those in Table T2.

Here, when comparing Tables T1 and T2, while there are other profile items with no values, such as "hometown" in Table T1 and "age" in Table T2, the values of "name" "alma mater" and "workplace", which are profile items with a high certainty factor, in Tables T1 and T2 match. A user of the web site and a person participating in an event, whose profile items with a high certainty factor match, can be considered to have a high possibility of being the same person.

Therefore, it is possible to have a configuration in which the profile estimation section 102 collates the values of profile items with a high certainty factor, for a user of the web site and a person participating in an event, and in the case where the values match, estimate that this user and this person are the same person.

As described above, by collating profiles by prioritizing profile items with a high certainty factor, it becomes possible to more accurately associate a user of the web site with a person participating in an event.

When a user of the web site is associated with a person participating in an event, the profile updating section 158 updates the profile of this person based on the profile of this user.

For example, in the case where there are user profile items capable of acquiring values from only the web site, the profile updating section 158 adds the profile items and their values acquired from the web site to the profile items estimated by the profile estimation section 102.

Further, for example, in the case where a value of a user profile item of the web site ("Tokyo Prefecture Minato Ward" in the example of FIG. 13) is information which is more detailed than that of a value of a profile item ("Tokyo Prefecture" in the example of FIG. 13) estimated by the profile estimation section 102, such as for the "place of residence" of the example of FIG. 13, the profile updating section 158 may substitute the value of the profile item estimated by the profile estimation section 102 with the value of the user profile item of the web site.

Heretofore, a second method, which collates each person stored in the person image database and each user of the web site, has been described with reference to FIG. 13.

(3-2-3: Profile Updating Method Using Images and Certainty Factors)

Heretofore, while methods, which collate each person stored in the person image database and each user of the web site using images or certainty factors, have been described, collation may be performed by using both images and certainty factors.

For example, first each person image $P_H$ and each user image $P_U$ are collated. Then, the images are collated by prioritizing the values of the profile items with a high certainty factor, for the profiles of a person and a user of the web site whose images are the most similar.

According to the above described collation method, it becomes possible to finally associate a person and a user, whose degree of similarity in the images is high and whose profile items with a high certainty factor match.

Further, in the case where there are no profile items extracted by the user profile acquisition section 156 which correspond to the profile items extracted by the profile estimation section 102, it becomes possible to more accurately perform an association between a person and a user, by collating the values of the profile items after first comparing the images as described above.

Heretofore, the modified example according to the present embodiment has been described with reference to FIGS. 11 to 13.

In the present modified example as described above, a profile is updated by analyzing web side information. Since information input by a user himself or herself is used, it becomes possible to update a profile with a higher accuracy, and to acquire values of the profile items which are not able to be estimated by only event information analysis or person image analysis.

Further, information management can be easily performed, by integrating information for a same person found in an event image group and a web site.

Note that in the above present modified example, while a profile estimated by person image analysis and event information analysis is updated based on information from a web site, the applicable range of the technology according to the present embodiment is not limited to this.

For example, profile estimation of a person and the calculation of certainty factors may be performed, based on person attributes determined by person image analysis and information from a web site, without considering event information.

<4: Application Examples>

Hereinafter, application examples related to a display method and use method of a profile extracted by the above described basic configuration or modified example will be described.

[4-1: First Application Example (Profile Display Using Certainty Factors; FIG. 14)]

Hereinafter, a first application example related to a profile display method using certainty factors will be described with reference to FIG. 14. FIG. 14 is an explanatory diagram for describing a first application example according to the present embodiment.

Note that while a description is carried forward hereinafter as using certainty factors updated by the certainty factor updating section 160 according to the above described modified example, it is also possible to perform profile display by using the certainty factors calculated by the certainty factor calculation section 104 as they are according to the above described basic configuration.

As a display method of a profile of each person, for example, there is a method which displays a person image $P_{PRO}$ of these persons and the values of each profile item. In the present application example, when displaying the values of each profile item, the display method changes according to the certainty factors of these profile items.

For example, as shown in FIG. 14, a profile display control section 202, which is included in the information processing apparatus 10 according to the present embodiment or in another apparatus, displays characters indicating the values of each profile item so that the characters get larger as the certainty factor of each profile item increases.

Since the certainty factor is high for a value $T_1$ (Yamada Taro) of a profile item provided by a user to a person image, for example, the profile display control section 202 displays the value $T_1$ with large characters.

Further, since the certainty factor is low for values $T_2$ (thirties) and $T_3$ (male) of profile items estimated by analysis of a person image, for example, the profile display control section 202 displays the values $T_2$ and $T_3$ with small characters.

Further, since the certainty factor is at a middle level for values $T_4$ (born in July), $T_5$ (hometown is Osaka Prefecture) and $T_6$ (living in Tokyo Prefecture) of profile items estimated by analyzing event incidental information, for example, the profile display control section 202 displays the values $T_4$, $T_5$ and $T_6$ with middle level sized characters.

Further, since the certainty factor is high for values $T_7$ (graduated from AAA University) and $T_8$ (working for CCC Company Limited) of profile items estimated by analyzing web site information, for example, the profile display control section 202 displays the values $T_7$ and $T_8$ with large characters.

Further, since the certainty factor is high for values of profile items estimated based on a plurality of pieces of information, such as person image group analysis and web site information analysis, for example, the profile display control section 202 displays these values with large characters.

Further, the profile display control section 202 may display each profile item instead of the values of each profile item, or along with the values of each profile item, as a profile. In this case, the display form may be changed according to the certainty factors for each profile item.

Further, besides changing the size of characters according to the certainty factor when displaying the values of each profile item, the profile display control section 202 may change the color of the characters according to the level of the certainty factor, may change the transparency of the characters according to the level of the certainty factor, or may set only the values of profile items with a high certainty factor to a prescribed color or underline them.

Further, the profile display control section 202 may display the source of information used for estimating the certainty factor of each profile item or each profile item, along with the values of each profile item.

By changing the display form of the values of each profile item, according to the level of the certainty factor of each profile item as described above, it becomes possible for the user to intuitively understand a certainty factor of each profile item, and to refer to the certainty factors when using a profile.

Heretofore, a first application example related to a profile display method using certainty factors has been described with reference to FIG. 14.

[4-2: Second Application Example (Event Search Using Certainty Factors; FIGS. 15 and 16]

Hereinafter, a second application example related to an event search using certainty factors will be described with reference to FIGS. 15 and 16. FIGS. 15 and 16 are explanatory diagrams for describing a second application example according to the present embodiment.

A profile is extracted for each person participating in each event, by the above described standard configuration or modified example. It is possible for the values of the extracted profile items to be used for a search of an event.

Here, for example, in the case where an event, in which a person "graduated from AAA University" has participated, is to be searched in an event image search which does not use a profile, a search may not be possible if "AAA University" is not included in the file name of the event images or the folder name storing the event images, and prescribed event images will not be included in a search result.

On the other hand, according to the above described standard configuration or modified example, a profile of each person included in an event image can be estimated, and values of the estimated profile items can be labeled for this event. As a result, it becomes possible for a user to easily and surely search for a prescribed event.

For example, as shown in FIG. 15, an event searching section 204, which is included in the information processing apparatus 10 according to the present embodiment or in another apparatus, displays "AAA University OB association" or "Taro's birthday party" as an event search result which includes a person whose value of the profile item "alma mater" is "AAA University".

In the case where a search word is set to "AAA University" in an event image search which does not use a profile, only items which include the search word can be extracted as a search result, such as the case where the folder name of an event image is "AAA University OB association".

However, according to the present application example, it is possible to extract events in which a person of "AAA University" has participated, even if the events are seemingly unrelated to "AAA University", such as the folder name of the event images for "Taro's birthday party".

In addition, in the case where a value of a profile item is set as a search word and an event search is performed, using the certainty factors of the profile items which are search words can also be considered.

For example, the event searching section 204 extracts persons who have a value of this profile item, which is a search word, for each event to be searched. Next, the certainty factors of all the persons extracted are added for each event, and are calculated as a certainty factor of this entire event.

Further, for example, not only are persons extracted who have values of this profile item, which is a search word, for each event to be searched, but also persons with this certainty factor equal to or above a prescribed threshold may be extracted, and a certainty factor of the entire event may be calculated.

By calculating the certainty factor of an entire event according to the above described two methods or the like, in the case where there are a plurality of events in which persons who have values of a profile item, which is a search word, participate, the event searching section 204 can prioritize the events in which the persons participate which have a high certainty factor of these profile items, and can display these events as a search result.

In the example shown in FIG. 15, a search result is shown in the case where a search word is set to "AAA University". "AAA University OB association", which is considered to include many persons with a high certainty factor of "alma mater" being "AAA University", is initially displayed as a search result with a high probability of reflecting the intention of a user.

In the example shown in FIG. 15, while "AAA University" is not included in the event title itself, "Taro's birthday party", in which persons of "AAA University" have participated as guests, is also displayed as a search result. However, this is displayed after "AAA University OB association", which has the highest certainty factor of the entire event.

Further, the certainty factor added for persons of this event who have values of the profile item, which is a search word, may be displayed along with the event of the search result, as a certainty factor which is a search result of this search word by event.

Further, in the case where a value of a profile item desired by a user is set as a search word and an event search is performed, the display form of an event may be changed, according to the certainty factor of the event displayed as an event search result.

For example, as shown in FIG. 16, differentiating the search results according to certainty factors can be considered, such as displaying a search result 2, with a certainty factor lower than that of a search result 1, smaller than the search result 1.

Heretofore, a second application example related to an event search using certainty factors has been described with reference to FIGS. 15 and 16.

According to the present application example such as described above, when displaying a plurality of search results when searching for an event, an order and display mode of each result display changes using the calculated certainty factors. As a result, it becomes possible to display a search result, which better reflects the intention of a person performing an event search, so that the search result is more easily understood.

<5: Process Flow Performed by the Information Processing Apparatus 10>

Hereinafter, the process flow performed by the information processing apparatus 10 will be described. First, the process flow in the case of the basic configuration described above in Section 2 will be described with reference to FIG. 17. Then, the process flow in the case of the modified example described above in Section 3 will be described with reference to FIG. 18.

Further, each of the process flows described hereinafter are examples, and may omit, add, or modify part of the processing steps.

[5-1: Process Flow in the Case of the Basic Configuration (FIG. 17)]

Figure 17:
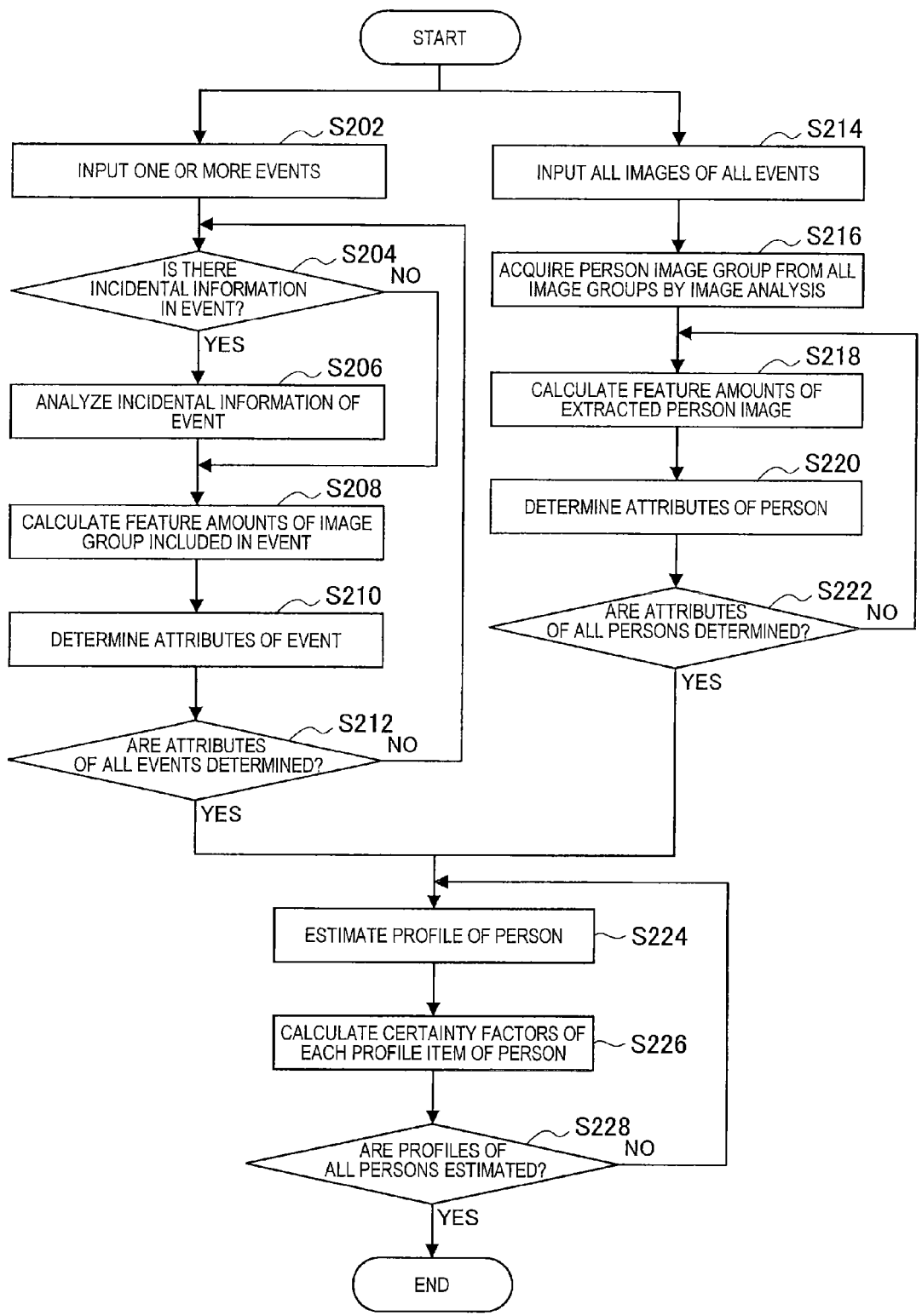
FIG. 17 is a flow chart which shows an example of a process flow performed by the information processing apparatus according to the first embodiment.

Hereinafter, the process flow in the case of the basic configuration will be described with reference to FIG. 17. FIG. 17 is a flow chart which shows an example of a process flow performed by the information processing apparatus according to the present embodiment.

As shown in FIG. 17, when one or more events are input to the information processing apparatus 10 (S202), the information processing apparatus 10 determines whether or not there is incidental information in the events (S204).

In the case where there is incidental information in the events, the event incidental information analyzing section 136 analyzes the event incidental information (S206). On the other hand, in the case where there is no incidental information in the events, the process proceeds to the next step S208.

Next, the event image feature amount calculation section 132 calculates feature amounts of an image group (event image group) included in the events (S208).

Next, the event attribute determination section 134 determines attributes of the events, based on the event incidental information and the feature amounts of the event image group (S210).

When the attributes are determined by the above described steps S204 to S210 for all events input to the information processing apparatus 10, the information processing apparatus 10 proceeds the processing to step S224 (S212).

Steps S202 to S212 described heretofore are processes performed by each section of the event information analyzing section 103. Next, steps S214 to S222 performed by each section of the person image group analyzing section 101 will be described.

All images of all events are input to the person image group acquisition section 112 (S214). When the images are input, the person image group acquisition section 112 acquires a person image group from all the input images, by image analysis (S216).

The person image feature amount calculation section 114 calculates feature amounts of a person image input from the person image group acquisition section 112 (S218). The person attribute determination section 116 determines attributes of persons participating in the events, based on the calculated feature amounts (S220).

When the attributes are determined by the above described steps S218 and S220 for all persons included in the event image group input to the information processing apparatus 10, the information processing apparatus 10 proceeds the processing to step S224 (S222).

Steps S214 to S222 described heretofore are processes performed by each section of the person image group analyzing section 101.

Next, the profile estimation section 102 estimates profiles of the persons, based on the input attributes of the events and persons (S224). Note that the profiles estimated by the profile estimation section 102 are stored in the profile database.

Next, the certainty factor calculation section 104 calculates certainty factors of each estimated profile item (S226). Note that the certainty factors of each profile item calculated by the certainty factor calculation section 104 are stored in the profile database.

When profile estimation is performed and these certainty factors are calculated by the above described steps S224 and S226 for each person included in the event image group input to the information processing apparatus 10, the information processing apparatus 10 ends the series of profile estimation processes (S228).

Heretofore, the process flow in the case of the basic configuration of the information processing apparatus 10 has been described with reference to FIG. 17.

Note that either the processes of steps S202 to S212 or the processes of steps S214 to S222 may be performed prior to the other, or may be performed in parallel. The process of step S224 may be started at the time when the event attributes determined by step S212 and the person attributes determined by step S222 are both completed.

[5-2: Process Flow in the Case of the Modified Example (FIG. 18)]

Figure 18:
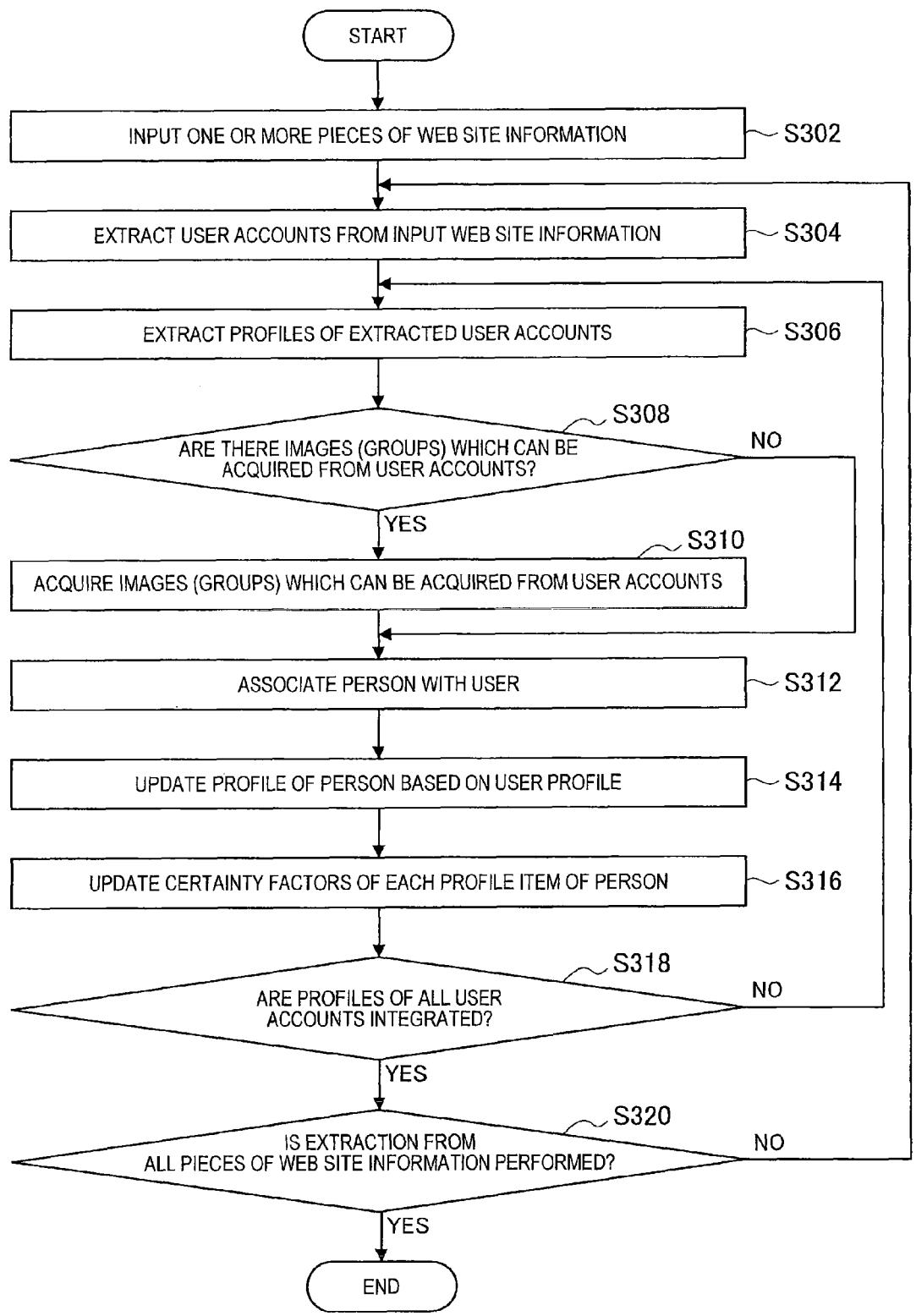
FIG. 18 is a flow chart which shows an example of a process flow performed by the information processing apparatus according to the modified example of the first embodiment.

Hereinafter, the process flow in the case of the above described modified example will be described with reference to FIG. 18. FIG. 18 is a flow chart which shows an example of a process flow performed by the information processing apparatus according to the modified example of the present embodiment.

However, the above described modified example may perform the series of processes of the above described basic configuration, and thereafter add further processes. Therefore, the process flow for the modified example will be hereinafter described as having performed the processes of the basic configuration. That is, it is presupposed that a profile is estimated, and certainty factors of all estimated profile items are calculated, for all the persons included in the event image group of all events.

As shown in FIG. 18, first one or more pieces of web site information are input to the web site information integration section 105 (S302). When the web site information is input, the user account extraction section 152 extracts user accounts of each user (S304).

Next, the user profile acquisition section 156 extracts user profiles corresponding to the user accounts of each user from the user profile database (S306).

Next, the web site information integration section 105 determines whether or not there are images or image groups which can be acquired from the user accounts (S308). In the case where there are images or image groups which can be acquired from the user accounts, the user image acquisition section 154 acquires the images or image groups which can be acquired from the user account (S310).

Next, the acquired user images and user profiles are input to the profile updating section 158. Further, the person image groups stored in the person image database, the person attributes stored in the person attribute database, and the profiles stored in the profile database, are also input to the profile updating section 158.

The profile updating section 158 associates each person participating in the events with each user of a web site, based on the above described input information (S312).

The profile updating section 158 additionally updates the profiles of each person participating in the events, based on the user profiles associated with each user account (S314).

Next, the certainty factor updating section 160 updates a certainty factor for each updated profile item (S316).

The information processing apparatus 10 updates the profile of each person participating in the events by the processes of the above described steps S306 to S316, based on the profiles of all user accounts of the web site (S318).

In addition, in the case where a plurality of pieces of information of the web site are input, when the processes of the above described steps S304 to S318 are performed for all user accounts, the information processing apparatus 10 ends the series of processes related to profile updating (S320).

Heretofore, the process flow in the case of the above described modified example of the present embodiment has been described with reference to FIG. 18.

<6: Conclusion>

Finally, the technical idea of the present embodiment will be simply consolidated. The technical idea described hereinafter can be applied, for example, to a variety of information processing apparatuses, such as a PC, mobile phone, mobile game machine, portable terminal, information appliance, or car navigation system.

(1) An information processing apparatus, including:
  an event information analyzing section which analyzes event information related to an event in which a person participates;
  a person image group analyzing section which analyzes, for the person participating in the event, a person image group including one or a plurality of person images including the person; and
  a profile estimation section which estimates a profile of the person participating in the event based on a result obtained by analyzing the person image group and a result obtained by analyzing the event information.

(2) The information processing apparatus according to (1), further including:
  a user information acquisition section which acquires, for a user registered in a service that shares information regarding users via a network, user information related to the user; and
  a profile updating section which associates the person with the user, and updates the profile of the person estimated by the profile estimation section based on the user information of the user associated with the person.

(3) The information processing apparatus according to (1) or (2),
  wherein the profile of the person includes one or a plurality of profile items, and
  wherein the information processing apparatus further includes:
    a certainty factor calculation section which calculates, for each profile item, a certainty factor showing certainty of the estimated profile items.

(4) The information processing apparatus according to (3), further including:
  a user information acquisition section which acquires, for a user registered in a service that shares information regarding users via a network, user information related to the user; and
  a certainty factor updating section which associates the person with the user, and updates the certainty factor of each profile item of the person according to the user information of the user associated with the person.

(5) The information processing apparatus according to (3) or (4), further including:
  a profile display control section which controls display forms of the profile items according to levels of the certainty factors associated with the profile items.

(6) The information processing apparatus according to any one of (3) to (5),
  wherein the certainty factor calculation section performs calculation in a manner that the certainty factors of the profile items estimated based on the person image group increase as the person images included in the person image group analyzed by the person image group analyzing section increase in number.

(7) The information processing apparatus according to any one of (1) to (6),
  wherein the event information related to the event includes
    an event image group including one or a plurality of event images which are images obtained by picking up the event, and
    event incidental information which is incidental to the event image group.

(8) The information processing apparatus according to any one of (3) to (7),
  wherein the certainty factor calculation section performs calculation in a manner that the certainty factors of the profile items estimated based on the event information that is manually input is higher than the certainty factors of the profile items estimated based on other event information and the certainty factors of the profile items estimated based on person images.

(9) The information processing apparatus according to any one of (3), (4), and (6) to (8), further including:
  an event searching section which sets a prescribed profile item as a search condition, and searches for an event,
  wherein in the case where there are a plurality of the events satisfying the search condition, the event searching section calculates, for each of the plurality of events, certainty factors of the plurality of events according to the levels of the certainty factors of the profile items related to one or a plurality of the persons included in the plurality of events, and selects a display form for each of the plurality of events according to the calculated certainty factors of each of the plurality of events.

(10) The information processing apparatus according to any one of (7) to (9),
  wherein the person image group analyzing section further includes a person image group acquisition section which acquires, as the person images, regions in which the person is included from the event images.

(11) The information processing apparatus according to any one of (1) to (10),
  wherein profiles for persons participating in a plurality of the events, which are estimated based on each of the plurality of events, are shared among the plurality of events.

(12) The information processing apparatus according to any one of (7) to (11), wherein the event incidental information includes information related to one or a plurality of
an event date when the event is held,
an event location where the event is held,
an event title which the user has provided for the event,
an event type, and
an event main person's name.

(13) The information processing apparatus according to any one of (3) to (12),
wherein the profile items include an item related to one or a plurality of
a name of the person,
a sex of the person,
an age of the person,
a place of residence of the person,
a hometown of the person, and
a date of birth of the person.

(14) The information processing apparatus according to (13),
wherein the profile estimation section estimates the name of a person, from among persons included in an event image group including one or a plurality of event images which are images obtained by picking up the event, who has a greatest number of person images included in the person image group to be an event main person's name of the event.

(15) The information processing apparatus according to any one of (3) to (14),
wherein the certainty factor calculation section calculates, in accordance with a value of a first profile item from among the profile items, the certainty factor of a second profile item different from the first profile item from among the profile items.

(16) The information processing apparatus according to any one of (2) to (15),
wherein the user information includes a user image showing the user in the service.

(17) The information processing apparatus according to (16),
wherein the profile updating section associates the user who has the user image similar to the person image group of the person as a person identical with the person.

(18) The information processing apparatus according to any one of (2) to (17),
wherein the profile of the person includes one or a plurality of profile items, and
wherein the profile updating section associates the user who has the user information matching the profile items whose certainty factors showing certainty are high, from among the profile items of the person, as a person identical with the person.

(19) An information processing method, including:
analyzing event information related to an event in which a person participates;
analyzing, for the person participating in the event, a person image group including one or a plurality of person images including the person; and
estimating a profile of the person participating in the event based on a result obtained by analyzing the person image group and a result obtained by analyzing the event information.

(20) A program for causing a computer to implement:
an event information analyzing function which analyzes event information related to an event in which a person participates;
a person image group analyzing function which analyzes, for the person participating in the event, a person image group including one or a plurality of person images including the person; and
a profile estimation function which estimates a profile of the person participating in the event based on a result obtained by analyzing the person image group and a result obtained by analyzing the event information.

(Remarks)

The web site is an example of a service which shares information between users via an event network.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-110930 filed in the Japan Patent Office on May 14, 2012, the entire content of which is hereby incorporated by reference.

What is claimed is:

1. An information processing apparatus, comprising:
circuitry configured to:
analyze event information related to an event in which a person participates;
analyze a person image group including a plurality of person images including the person and store the person image group in a database;
estimate a profile, comprising one or more profile items, of the person participating in the event based on a result obtained by analyzing the person image group and a result obtained by analyzing the event information and store the estimated profile;
determine, for each of the one or more profile items, a certainty factor; and
control display forms of the one of more profile items being displayed, wherein controlling the display forms include changing one or more of: size, color or transparency of characters indicating values of the one or more profile items according to levels of certainty factors associated with the one or more profile items.

2. The information processing apparatus according to claim 1, wherein the circuitry is further configured to:
acquire, for a user registered in a service that shares information regarding users via a network, user information related to the user; and
associate the person with the user, and update the estimated profile of the person based on the user information of the user associated with the person.

3. The information processing apparatus according to claim 1,
wherein the circuitry is further configured to:
acquire, for a user registered in a service that shares information regarding users via a network, user information related to the user; and
associate the person with the user, and update the certainty factor of each of the one or more profile items of the person according to the user information of the user associated with the person.

4. The information processing apparatus according to claim 1,
wherein the circuitry is configured to perform calculation in a manner that the certainty factors of the profile items estimated based on the person image group increase as the person images included in the analyzed person image group increase in number.

5. The information processing apparatus according to claim 1,
wherein the event information related to the event includes an event image group including one or a plurality of event images which are images related to the event, and
event incidental information which is incidental to the event image group.

6. The information processing apparatus according to claim 1,
the circuitry is configured to perform calculation in a manner that the certainty factors of the profile items estimated based on the event information that is manually input is higher than the certainty factors of the profile items estimated based on other event information and the certainty factors of the profile items estimated based on person images.

7. The information processing apparatus according to claim 1, wherein the circuitry is further configured to:
set a prescribed profile item as a search condition, and search for an event,
wherein in case where there are a plurality of the events satisfying the search condition, the circuitry is configured to calculate, for each of the plurality of events, certainty factors of the plurality of events according to the levels of the certainty factors of the one or more profile items related to one or a plurality of the persons included in the plurality of events,
and select a display form for each of the plurality of events according to the calculated certainty factors of each of the plurality of events.

8. The information processing apparatus according to claim 5, wherein the circuitry is configured to acquire, as the person images, regions in which the person is included from the event images.

9. The information processing apparatus according to claim 1,
wherein profiles for persons participating in a plurality of the events, are estimated based on each of the plurality of events, and are changed based on each of the plurality of events.

10. The information processing apparatus according to claim 5, wherein the event incidental information includes information related to one or a plurality of:
an event time in case the event is held,
an event location where the event is held,
an event title which the user has provided for the event,
an event type, and
an event main person's name.

11. The information processing apparatus according to claim 1, wherein the profile items include an item related to one or a plurality of:
a name of the person,
a sex of the person,
an age of the person,
a place of residence of the person,
a hometown of the person, and
a date of birth of the person.

12. The information processing apparatus according to claim 11,
wherein the circuitry is configured to estimate the name of a person, from among persons included in an event image group including one or a plurality of event images which are images related to the event, who has a greatest number of person images included in the person image group to be an event main person's name of the event.

13. The information processing apparatus according to claim 1,
wherein the circuitry is configured to calculate, in accordance with a value of a first profile item from among the one or more profile items, the certainty factor of a second profile item different from the first profile item from among the one or more profile items.

14. The information processing apparatus according to claim 2, wherein the user information includes a user image showing the user in the service.

15. The information processing apparatus according to claim 14, wherein the circuitry is configured to associate the user who has the user image similar to the person image group of the person as a person identical with the person.

16. The information processing apparatus according to claim 2,
wherein the circuitry is configured to associate the person with the user who has the user information matching the profile items from among the profile items of the person, based on a certainty factor for each of the profile items.

17. The information processing apparatus according to claim 1, wherein each of the one or more profile items has a certainty factor which reflects the reliability of estimation method for estimating each of the one or more profile items.

18. The information processing apparatus according to claim 1, wherein the circuitry is configured to estimate the person, as a main person of the event, based on a number of times the person is included in the person image group.

19. The information processing apparatus according to claim 1, wherein the estimated profile and the certainty factor for each of the profile items are shared across a plurality of events.

20. An information processing method, comprising:
analyzing event information related to an event in which a person participates;
analyzing a person image group including a plurality of person images including the person and storing the person image group in a database;
estimating a profile, comprising one or more profile items, of the person participating in the event based on a result obtained by analyzing the person image group and a result obtained by analyzing the event information, and storing the estimated profile;
determining, for each of the one or more profile items, a certainty factor; and
controlling display forms of the one of more profile items being displayed, wherein controlling the display forms include changing one or more of: size, color or transparency of characters indicating values of the one or more profile items according to levels of certainty factors associated with the one or more profile items.

21. A non-transitory computer-readable medium having stored thereon, a set of computer-executable instructions for causing the computer to perform operations comprising:
analyzing event information related to an event in which a person participates;
analyzing a person image group including a plurality of person images including the person, and storing the person image group in a database; and
estimating a profile, comprising one or more profile items, of the person participating in the event based on a result obtained by analyzing the person image group and a result obtained by analyzing the event information, and storing the estimated profile;
determining, for each of the one or more profile items, a certainty factor; and controlling display forms of the one of more profile items being displayed, wherein controlling the display forms include changing one or more of: size, color or transparency of characters indicating values of the one or more profile items according to levels of certainty factors associated with the one or more profile items.

\* \* \* \* \*